United States Patent
Johannessen et al.

(10) Patent No.: US 10,556,706 B2
(45) Date of Patent: Feb. 11, 2020

(54) INTEGRATED AIRCRAFT SIGNAGE, LIGHTING, AND DISPLAY SYSTEM

(71) Applicant: B/E Aerospace, Inc., Winston-Salem, NC (US)

(72) Inventors: Eric Johannessen, Holbrook, NY (US); Andre Hessling, Winston-Salem, NC (US); Alvin S. Bartolome, Eastvale, CA (US); Arthur Loic Dibeton Tchakounte, Covina, CA (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 16/558,773

(22) Filed: Sep. 3, 2019

(65) Prior Publication Data

US 2020/0002024 A1 Jan. 2, 2020

Related U.S. Application Data

(63) Continuation-in-part of application No. 16/550,904, filed on Aug. 26, 2019, which is a continuation of (Continued)

(51) Int. Cl.
*B64D 47/00* (2006.01)
*B64D 47/02* (2006.01)
(Continued)

(52) U.S. Cl.
CPC .......... *B64D 47/02* (2013.01); *B64D 11/00* (2013.01); *F21K 9/20* (2016.08); *G09F 13/10* (2013.01);
(Continued)

(58) Field of Classification Search
CPC ......... G02F 1/133305; G02F 1/133308; G02F 2001/133311–133337; B64D 47/02–04
(Continued)

(56) References Cited

U.S. PATENT DOCUMENTS 6,256,078 B1 * 7/2001 Ogata ............... B64D 11/0015
  349/58
6,667,089 B1   12/2003 Barker
(Continued)

FOREIGN PATENT DOCUMENTS

CA  2897057 A1  1/2016
EP  1041211 A2  10/2000
EP  3148186 A1  3/2017

OTHER PUBLICATIONS

Extended European Search Report dated Jul. 22, 2019 for EP Application No. 19168121.2.

*Primary Examiner* — Gerald J Sufleta, II
(74) *Attorney, Agent, or Firm* — Suiter Swantz pc llo

(57) ABSTRACT

An integrated aircraft lighting and display panel includes high-density arrays of micro-scale light-emitting diodes (LED) set into arrays (e.g., linear, two-dimensional, freeform) to form tiles, the LED tiles combined and interconnected to form LED panels conformable to any interior surface within an aircraft cabin. The PCB and LED arrays may be set into structural layers corresponding to overhead panels, side panels, bin panels, divider panels, doorway panels, galley and monument panels, or other interior structural panels of the aircraft. The LED arrays may be activated by an onboard video processor and local panel-level controllers to provide cabin lighting, indicate aircraft signage, display high-resolution image or video graphics, or simultaneously blend any combination thereof, either on command or in response to detected conditions.

15 Claims, 19 Drawing Sheets

Related U.S. Application Data application No. 16/030,560, filed on Jul. 9, 2018, now Pat. No. 10,392,129, which is a continuation-in-part of application No. 15/950,032, filed on Apr. 10, 2018, now abandoned.

(51) Int. Cl.
  *G09F 13/10* (2006.01)
  *G09F 13/22* (2006.01)
  *B64D 11/00* (2006.01)
  *F21K 9/20* (2016.01)

(52) U.S. Cl.
  CPC ...... *G09F 13/22* (2013.01); *B64D 2011/0038* (2013.01); *B64D 2203/00* (2013.01); *G09F 2013/222* (2013.01); *G09F 2013/227* (2013.01)

(58) Field of Classification Search
  USPC .......................................................... 362/471
  See application file for complete search history.

(56) References Cited

U.S. PATENT DOCUMENTS

| | | | |
|---|---|---|---|
| 8,176,520 B1* | 5/2012 | Mitchell | H04N 7/18 |
| | | | 725/76 |
| 9,643,536 B2 | 5/2017 | Staudigel et al. | |
| 9,996,754 B2 | 6/2018 | Brauer | |
| 2006/0002110 A1 | 1/2006 | Dowling et al. | |
| 2012/0307057 A1* | 12/2012 | Berkhahn | B64D 45/0015 |
| | | | 348/144 |
| 2017/0094166 A1 | 3/2017 | Riedel | |
| 2017/0214945 A1* | 7/2017 | Chang | H04H 20/71 |
| 2019/0072951 A1* | 3/2019 | Clark | B64D 1/02 |
| 2019/0250601 A1* | 8/2019 | Donahoe | B64C 39/024 |
| 2019/0261619 A1* | 8/2019 | Okumura | B64C 27/08 |
| 2019/0281680 A1* | 9/2019 | Thorne | H05B 33/0857 |
| 2019/0289336 A1* | 9/2019 | Finkhelstein | H04N 21/2146 |

\* cited by examiner

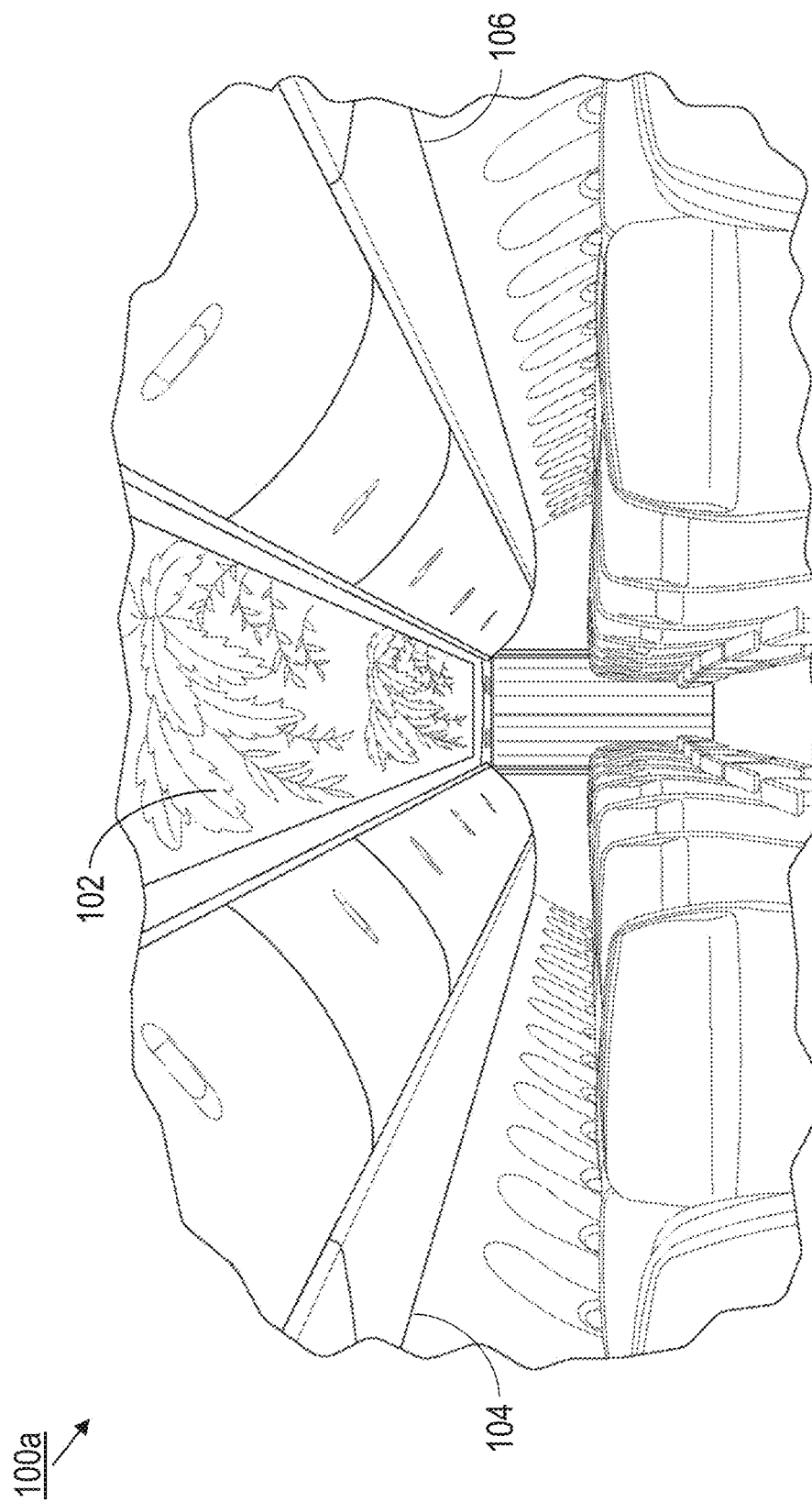

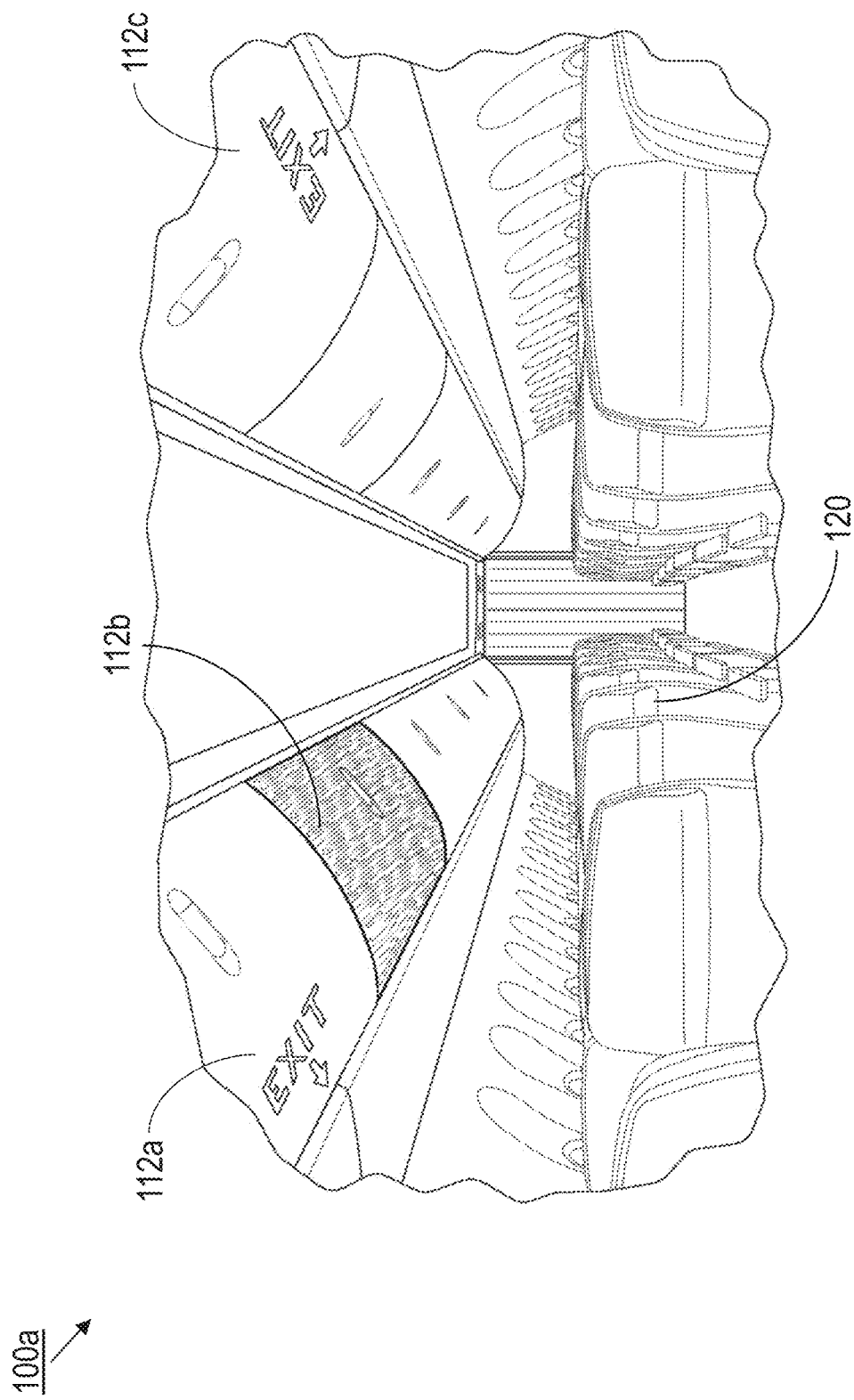

INTEGRATED AIRCRAFT SIGNAGE, LIGHTING, AND DISPLAY SYSTEM

CROSS-REFERENCE TO RELATED APPLICATIONS

The instant application claims priority under 35 U.S.C. § 120 as a continuation-in-part of the following co-pending U.S. Patent Applications:

U.S. patent application Ser. No. 16/550,904, filed Aug. 26, 2019; U.S. patent application Ser. No. 16/030,560, filed Jul. 9, 2018, which issued Aug. 27, 2019 as U.S. Pat. No. 10,392,129; and U.S. patent application Ser. No. 15/950,032, filed Apr. 10, 2018. Said U.S. patent application Ser. Nos. 16/550,904, 16/030,560, and 15/950,032 are herein incorporated by reference in their entirety.

BACKGROUND

Cabin lighting, signage, and image/video display within conventional passenger aircraft is generally accomplished via separate and distinct systems. Cabin lighting may include fluorescent-based lighting systems and signage (e.g., safety warnings and exit indicators) based around translucent surfaces backlit by individual bulbs. Zone divider bulkheads or monuments may include additional screens for video display (but may provide limited options and allow screens of limited size). Such islanded lighting systems may be relatively high-maintenance (e.g., due to the need to replace or repair individual bulbs), is rarely interactive in any meaningful way (e.g., cabin lighting is rarely adjustable beyond "on", "off", and occasionally "dimmed" states), and adds weight from individual power sources and wiring systems.

SUMMARY

A monument installable in an aircraft cabin is disclosed. In embodiments, the monument includes one or more exterior surfaces. One or more monument panels may be attached to or partially embedded within one or more of the exterior surfaces. Each monument panel includes a flexible substrate (e.g., which may conform to the exterior surface) and a panel-level lighting/display controller connecting the monument panel to onboard power supplies, networks, or data interfaces. Each substrate includes one or more light-emitting diode (LED) tiles arranged thereon, each LED tile including a printed circuit board (PCB) and a group or array (one-dimensional, two-dimensional, freeform) of individual LED units arranged thereon. Each LED tile has a tile-level microcontroller in communication with the display controller and the local array of LED unit, such that a selection of individual LED units generate a luminous/display output on activation by the microcontroller. The luminous/display output may correspond to relatively static aircraft signage, uniformly luminous aircraft lighting, or high-resolution display of static or streaming images. The monument panel includes one or more outer decorative layers allowing full or partial transmission of the luminous/display output into the aircraft cabin within which the monument is installed, while providing a decorative exterior appearance for the monument if the LED tiles are not active.

An integrated micro-LED signage, lighting, and display system is also disclosed. In embodiments, the system includes a master display controller connected to an aircraft-based power supply, network, or data interface. The system includes one or more display panels attachable to or embeddable in an aircraft interior panel (e.g., class dividers, monuments, ceilings, walls, doors, or any other interior surface). Each display panel includes a flexible substrate (which may conform to the interior panel or surface) and one or more LED tiles (e.g., arrays) arranged on the substrate. Each LED tile includes a printed circuit board (PCB) and a group or array (one-dimensional, two-dimensional, freeform) of individual LED units arranged thereon. Each LED tile has a tile-level microcontroller in communication with the display controller and the local array of LED unit, such that a selection of individual LED units generate a luminous/display output on activation by the microcontroller. The luminous/display output may correspond to relatively static aircraft signage, uniformly luminous aircraft lighting, or high-resolution display of static or streaming images.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 2A through 2D illustrate operations of the integrated aircraft lighting and display panel system of FIG. 1;

DETAILED DESCRIPTION OF EXEMPLARY EMBODIMENTS

Figure 1:
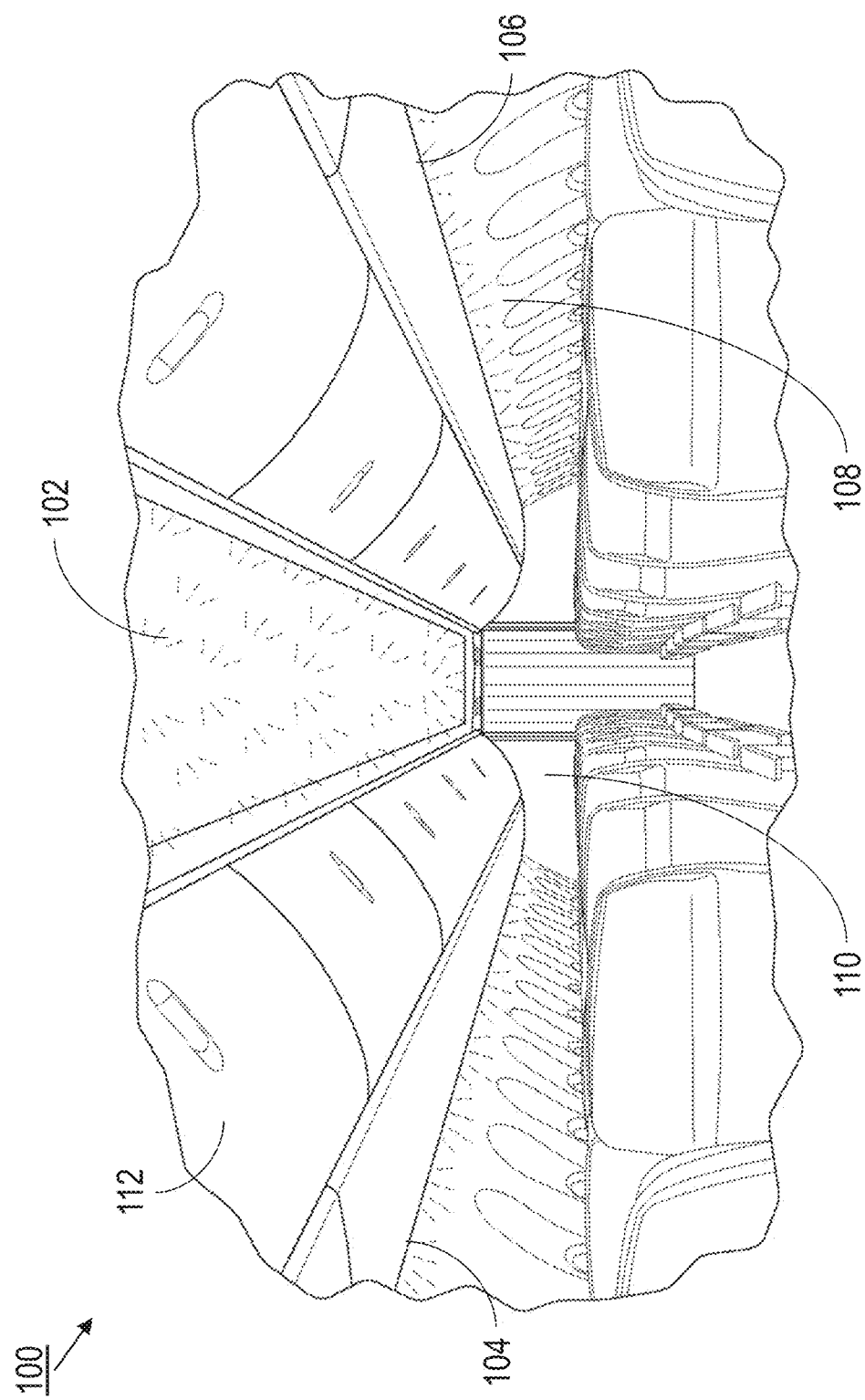
FIG. 1 illustrates an exemplary embodiment of an integrated aircraft lighting and display system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an integrated aircraft lighting and display system capable of simultaneously providing high-resolution graphic and video display, cabin lighting, and signage across any desired interior surface of the passenger cabin without the bulk and complexity of islanded lighting, signage, and display systems. For example, micro-LED arrays are set into flexible substrates and contoured to overhead panels, side panels, bin panels, doorway panels, or other interior surfaces.

Referring to FIG. 1, an exemplary embodiment of an integrated aircraft lighting and display system 100 may include an integrated overhead lighting and display panel 102 and supplemental lighting and display panels 104, 106. For example, the overhead lighting and display panel 102 may replace conventional aircraft overhead lighting by embedding within an overhead panel a high-density array of light emitting diodes (LED) of microscopic (<1 mm) size (e.g., micro-LED or μLED; chipscale LED). The LED array may incorporate standard or organic LEDs (OLED); quantum dots (qdots; QD) or other like semiconducting nanocrystals; or phosphor-converted LEDs. The integrated aircraft lighting and display system 100 may incorporate μLED arrays contoured to any interior or structural surface of the aircraft cabin, e.g., inner walls 108 or portions thereof; zone divider bulkheads 110 or monuments; and individual compartment or bin panels (112). The integrated aircraft lighting and display system 100 may incorporate white, monochromatic, red/green/blue (RGB), white/RGB, or full-spectrum LEDs in order to provide a broad array of highly modifiable lighting and display options on almost any interior surface. For example, the overhead lighting and display panel 102 may incorporate a diffuser layer over the LED array in order to provide a uniformly illuminated, glare-free surface evocative of, or similar to, natural sky just after sunrise or before sunset. The illuminated surface of the overhead lighting and display panel 102 may be further modifiable or tunable, e.g., according to the time of day or the current flight segment (dimmer for transoceanic flights, brighter during taxi, take-off and landing (TTL) phases). The output of the supplemental lighting and display panels 104, 106 may be synchronized to match that of the overhead lighting and display panel 102.

Referring to FIGS. 2A through 2D, the integrated aircraft lighting and display system 100a may be implemented and may operate similarly to the integrated aircraft lighting and display system 100 of FIG. 1, except that the overhead lighting and display panel 102 of the integrated aircraft lighting and display system 100a may display high resolution graphics. For example, the use of embedded high-density μLED arrays allows the display output of the supplemental lighting and display panels 104, 106 to be synchronized with that of the overhead lighting and display panel 102, providing "mood lighting" in support of the graphics displayed overhead. Similarly, the integrated aircraft lighting and display system 100a may unify cabin lighting, display, branding, signage, and visual enhancements by employing other interior surfaces to display static aircraft signage. For example, referring in particular to FIG. 2B, the overhead lighting and display panel 102 (as well as the zone divider panels (110), bin panels (112), doorway panels (114), overhead side panels (116), or other interior panels described above) may incorporate LED arrays for displaying, e.g., exit indicators, directional lighting, seatbelt signs, no-smoking signs, or row indicators as well as the high-resolution graphics shown by FIG. 2A.

Referring in particular to FIG. 2C, the bin panels 112a-c may be implemented and may function similarly to the bin panels 112 of FIG. 1, except that the bin panels 112a-b may similarly display signage and warning notices while the bin panels 112c may be individually illuminated, e.g., to indicate that passengers occupying seats (120) in a particular row may deplane first. For example, one or more passengers seated in an aft row may have an especially urgent or short connection they might otherwise miss, were they to wait for all passengers in forward rows to deplane first.

Figure 2B:
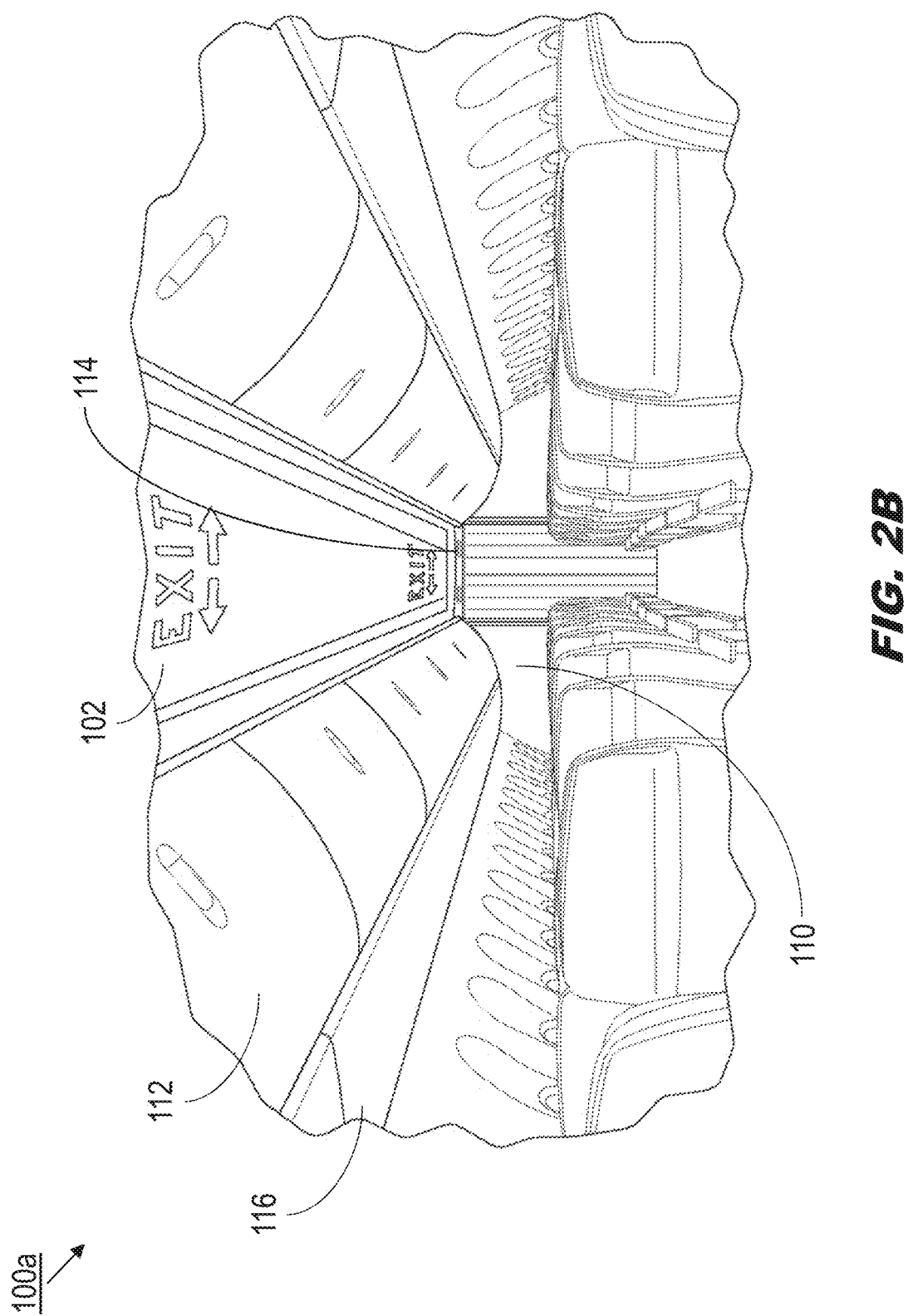
Figure 2D:
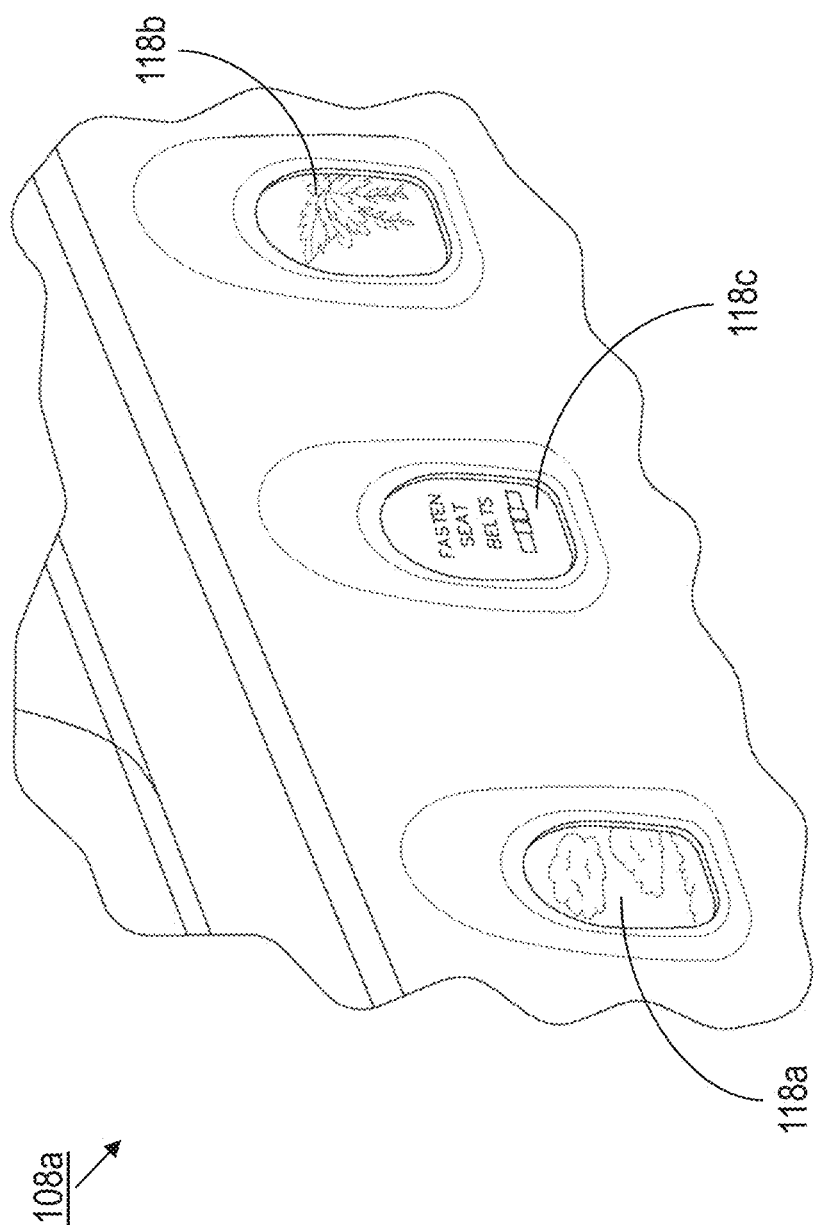

Referring in particular to FIG. 2D, the inner walls 108a may be implemented and may function similarly to the inner walls 108 of FIG. 1, except that the aircraft interior may be a "windowless cabin" wherein the inner walls 108a include, instead of conventional windows, LED-incorporated portions (118a-c) aligned with the aircraft seats (120). The LED-incorporated portions 118a-c may include LED arrays linked to exterior cameras and image sensors (not shown) configured to capture exterior views of the aircraft, which may then be displayed by the LED-incorporated portions (118a-b). The LED-incorporated portions 118c may additionally or alternatively display signage or emergency messages as needed. The captured images may, e.g., be brightened or dimmed for display to reflect the orientation of the sun and create an accurate illusion of sunlight based on the position of each seat 120 or row.

Figure 3A:
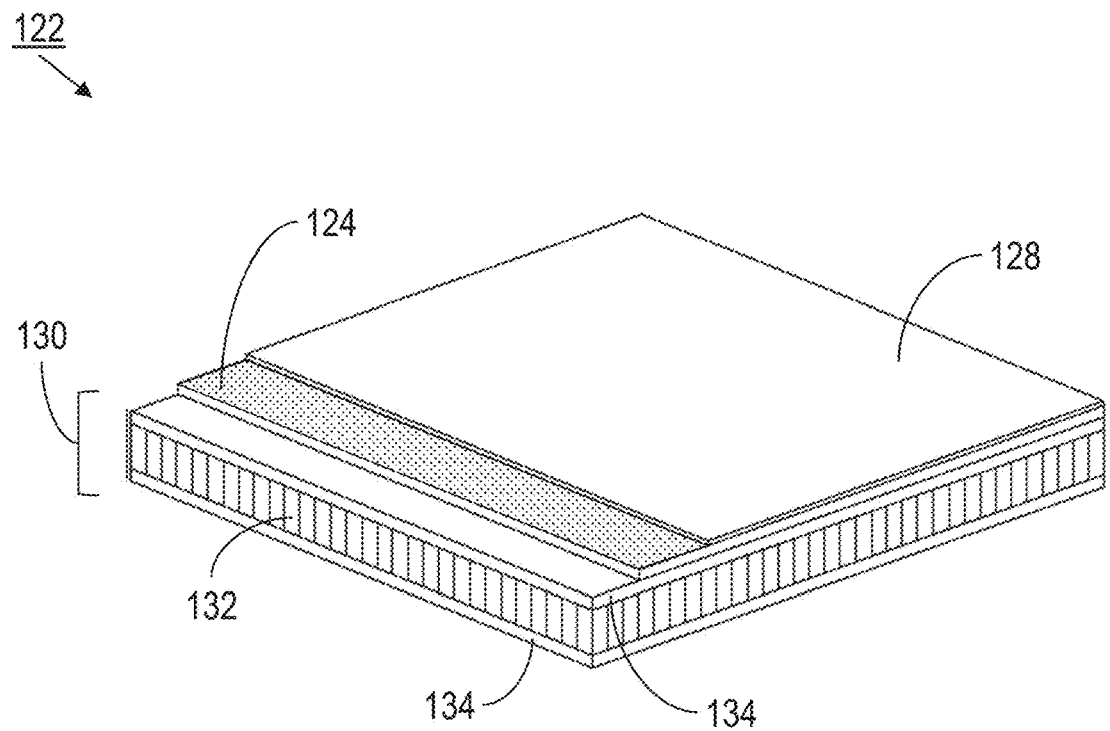
FIGS. 3A and 3B illustrate the structure of individual panels of the integrated aircraft lighting and display panel system of FIG. 1.
Figure 3B:
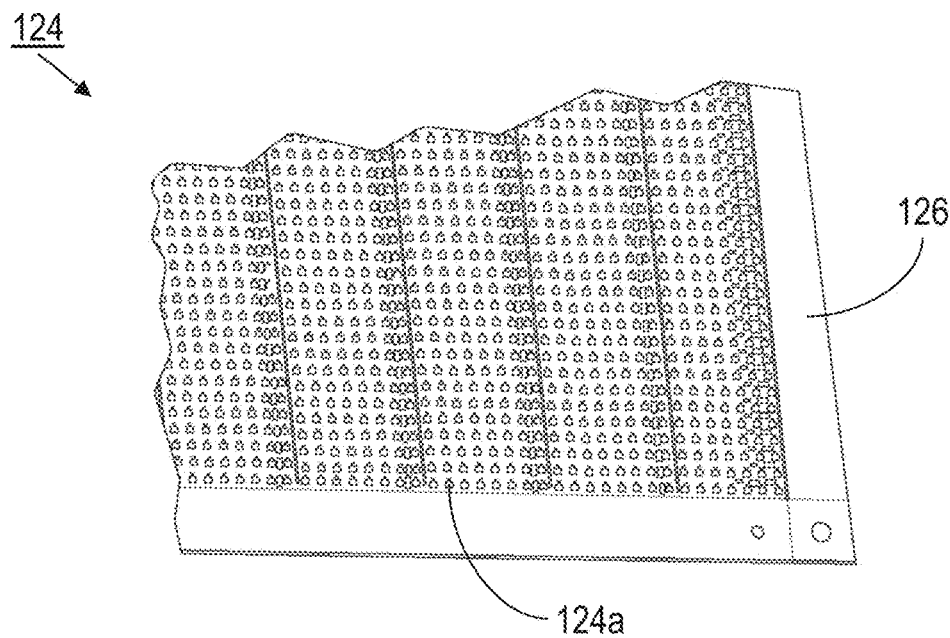

Referring to FIGS. 3A and 3B, an individual panel 122 of the integrated aircraft lighting and display system 100a may include any or all of an overhead lighting and display panel 102 (FIGS. 2A-2D), a supplemental lighting and display panel 104, 106 (FIGS. 2A-2D), an LED-incorporated portion 118 (FIG. 2D) of an inner wall 108a (FIG. 2D), a zone divider bulkhead 110 (FIG. 1), a monument panel; a compartment or bin panel 112a-c (FIG. 2C), a doorway panel 114 (FIG. 2B), or an overhead side panel 116 (FIG. 2B). The individual panel 122 may incorporate a layered structure. For example, the LED array 124 may be a two-dimensional array incorporating a high-density concentration of LEDs or μLEDs (124a) set into a flexible printed circuit board 126 (PCB) or similar appropriate flexible substrate (e.g., Kapon flexible PCB, <0.015 inch FR-4 PCB, any similar thin flexible material including traces applied directly to composite panels). The flexible PCB 126 and LED array 124 may then be sandwiched between one or more translucent or transparent decorative layers (128) and one or more structural layers (130), such that the flexible PCB 126 contours to the shape of the desired aircraft panel.

For example, the decorative layer 128 may include a transparent encapsulant or a diffuser layer for filtering the output of the LED array 124 into the appearance of a uniformly lit surface (see, e.g., FIG. 1). If the integrated aircraft lighting and display system 100b will be configured for high-resolution image, video display, or signage functions, the LED array 124 may include exclusively polychromatic (e.g., RGB) μLEDs 124a; however, if the integrated aircraft lighting and display system 100a will be configured for cabin lighting functions, the LED array 124 may include exclusively white μLEDs (or other monochromatic μLEDs). If the integrated aircraft lighting and display system 100a will be configured for multiple functionalities (e.g., able to provide lighting, signage, and display alternatively or simultaneously) the LED array 124 may include a combination of white/monochromatic and RGB/polychromatic μLEDs 124a. The structural layers 130 may include any appropriate composite materials (e.g., fiberglass, carbon-fiber) pre-impregnated or pre-contoured to correspond to the desired aircraft panels, e.g., honeycomb-structured composite (132) sandwiched between pre-impregnated composite layers (134). The LED array 124, embedded in the flexible PCB 126, may then be contoured to match the contours of the structural layers 130 and, accordingly, any desired aircraft panel.

Figure 4A:
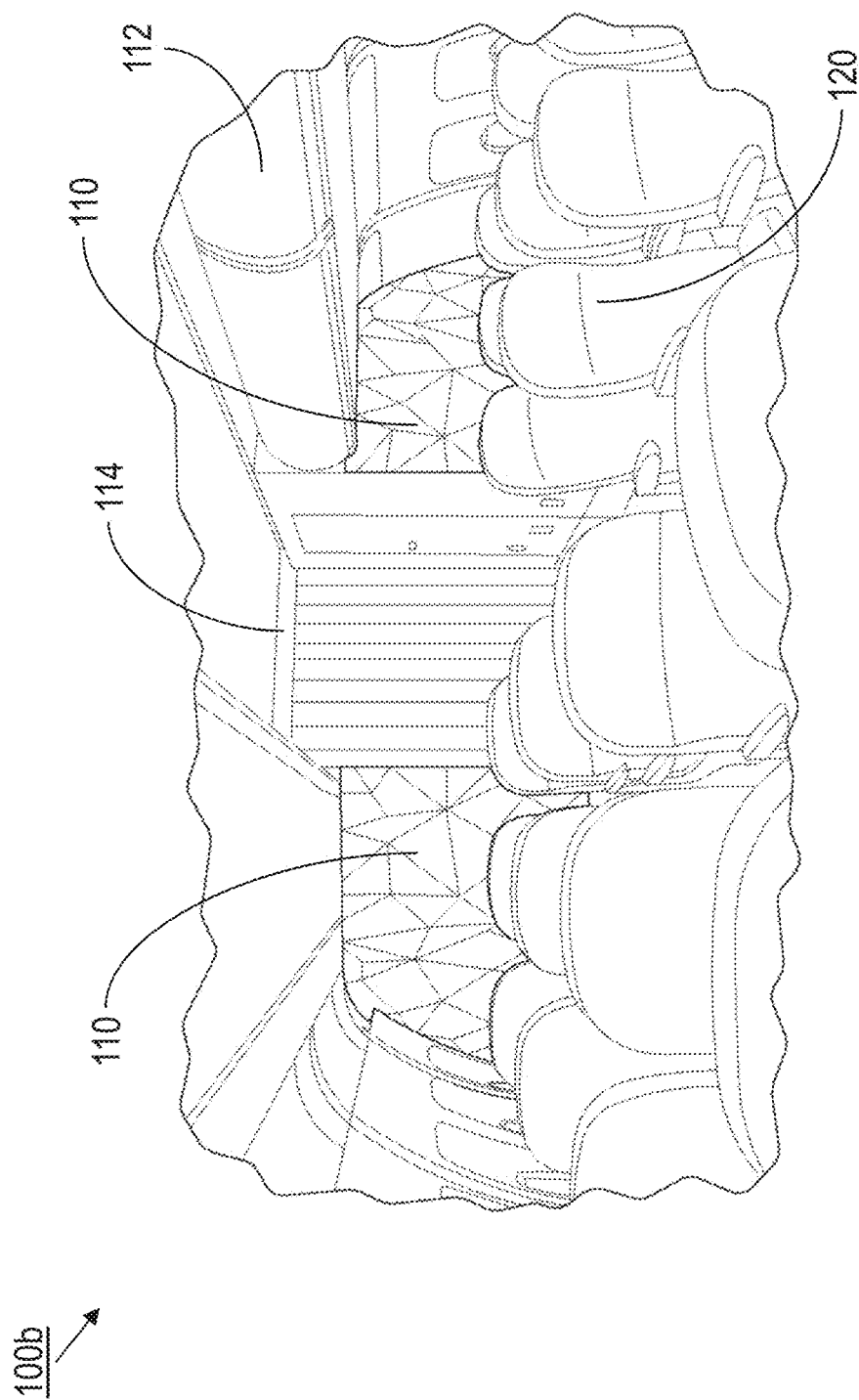
FIGS. 4A and 4B illustrate operations of the integrated aircraft lighting and display panel system of FIG. 1.
Figure 4B:
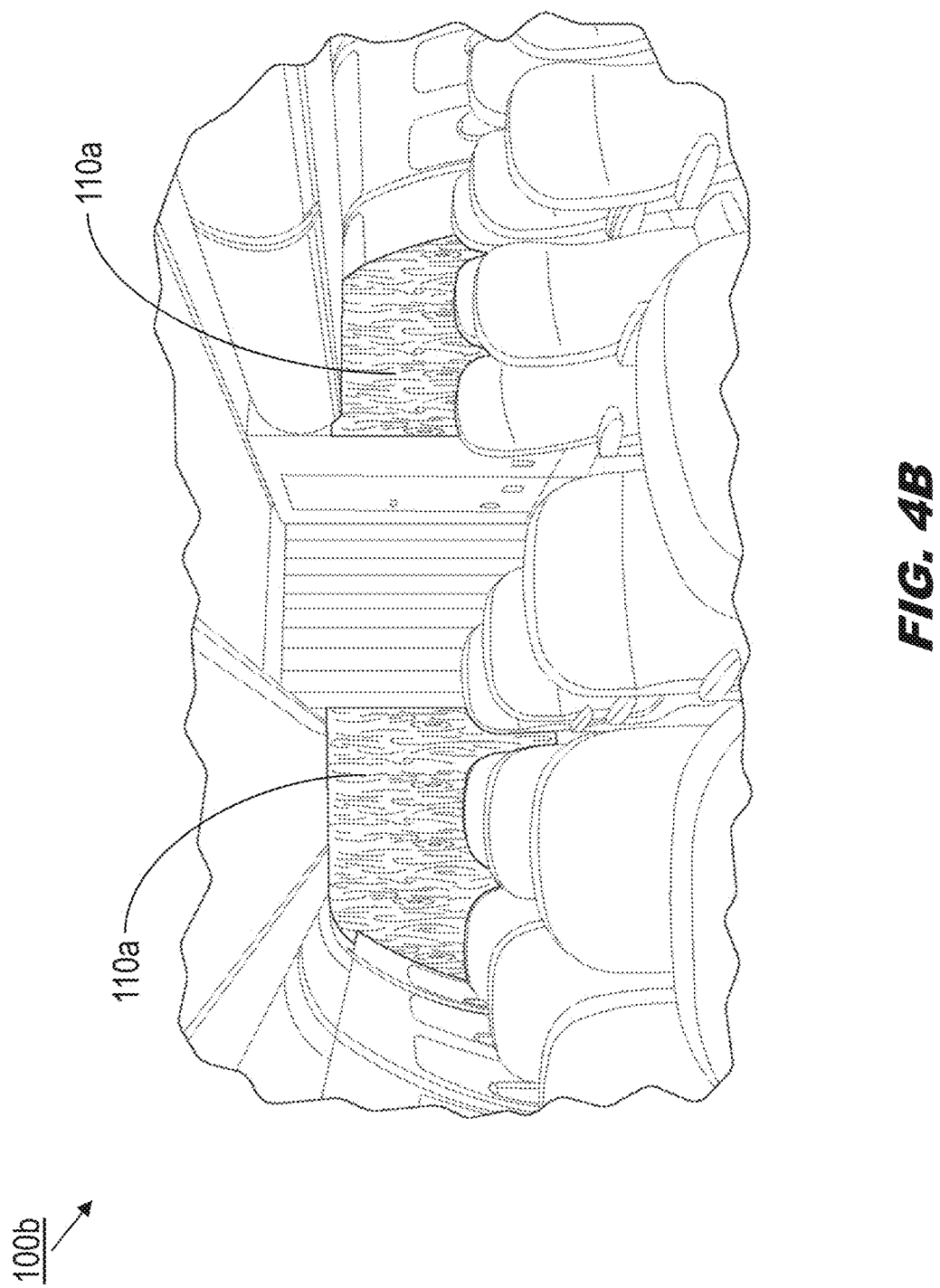

Referring to FIGS. 4A and 4B, the integrated aircraft lighting and display system 100b may be implemented and may function similarly to the integrated aircraft lighting and display system 100a of FIGS. 2A-2D, except that a zone divider bulkhead 110 (or any other individual panel (122, FIG. 3) or aircraft panel surface described above) may simultaneously provide cabin illumination, signage (e.g., fasten-seat-belt or no-smoking signs), and still/streaming image display (e.g., for decorative, atmospheric, or branding purposes) on a single surface. Similarly, a doorway panel 114 may provide signage (e.g., exit markers) and additional illumination, and a bin panel 112 may be illuminated once the aircraft has landed to indicate, e.g., that passengers in an associated row of aircraft seats 120 may deplane first, or that items may remain within the associated bin.

Referring in particular to FIG. 4B, the zone divider panels 110a may be implemented and may function similarly to the zone divider panels 110 of FIG. 4A, except that the decorative layers (128, FIG. 3) of the zone divider panels 110a may be fashioned to mimic the outward appearance of other natural, synthetic, or decorative materials (e.g., wood, stone, bamboo, fabric, leather, metal) when the zone divider panels 110a are otherwise inactive. When, for example, the zone divider panels 110a are activated for the display of high-resolution graphics, lighting, or signage, their appearance may revert to that of the zone divider panels 110 of FIG. 4A.

Figure 5:
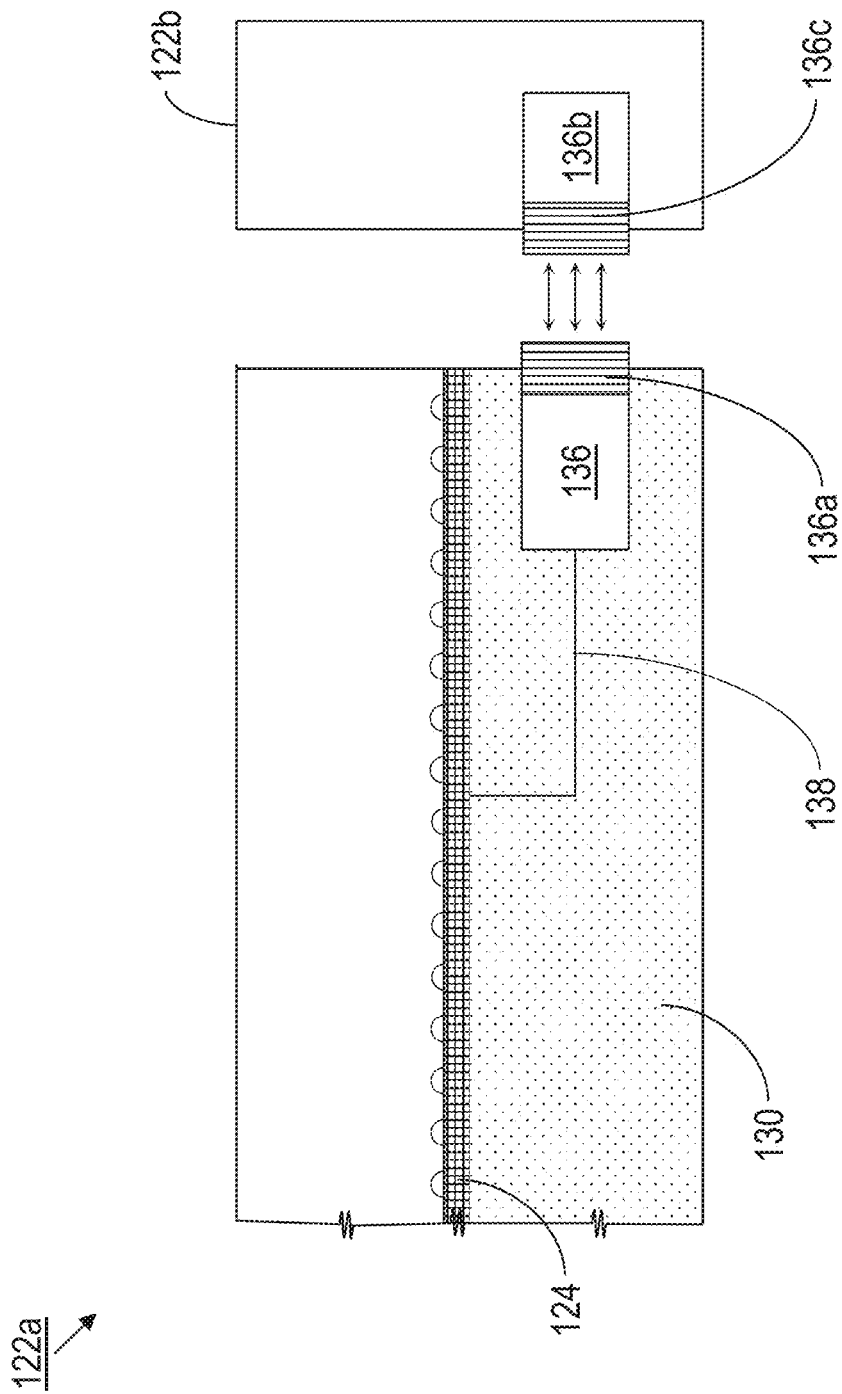
FIG. 5 is a diagrammatic cross-section illustration of the integrated aircraft lighting and display panel system of FIG. 1.

Referring to FIG. 5, the individual panel 122a may be implemented and may function similarly to the individual panel 122 of FIG. 3, except that the individual panel 122a may incorporate or embed within its structural layers 130 a display controller 136 connected to the LED array 124 by traces (138). The display controller 136 may include processors programmed to independently regulate the display output of the LED array 124 (e.g., based on a time, a flight segment, a temperature, or some other detected condition). The display controller 136 may be connected, physically or wirelessly, to an aircraft controller configured to regulate the output of the individual panel 122a, e.g., as part of a group of panels corresponding to a region of the aircraft, or as the controller of the integrated aircraft lighting and display system 100b (FIGS. 4A/B). The display controller 136 may include a conductive or communicative portion (136a) protruding at least partially from the individual panel 122a. The individual panel 122a may be physically installed proximate to at least one neighboring or adjacent individual panel (122b) whose embedded display controller 136b similarly includes a communicative portion 136c. When multiple individual panels 122a-b are fitted into place, the corresponding display controllers 136, 136b and protruding portions 136a, 136c may be disposed such that multiple communicative portions 136a, 136c contact each other and establish a communicative connection between the corresponding display controllers 136, 136b. In this way an individual panel 122a may coordinate operations with other adjacent individual panels 122b, or the individual panel 122a may relay control input (e.g., received from an aircraft network controller) to an adjacent individual panel 122b.

Figure 6A:
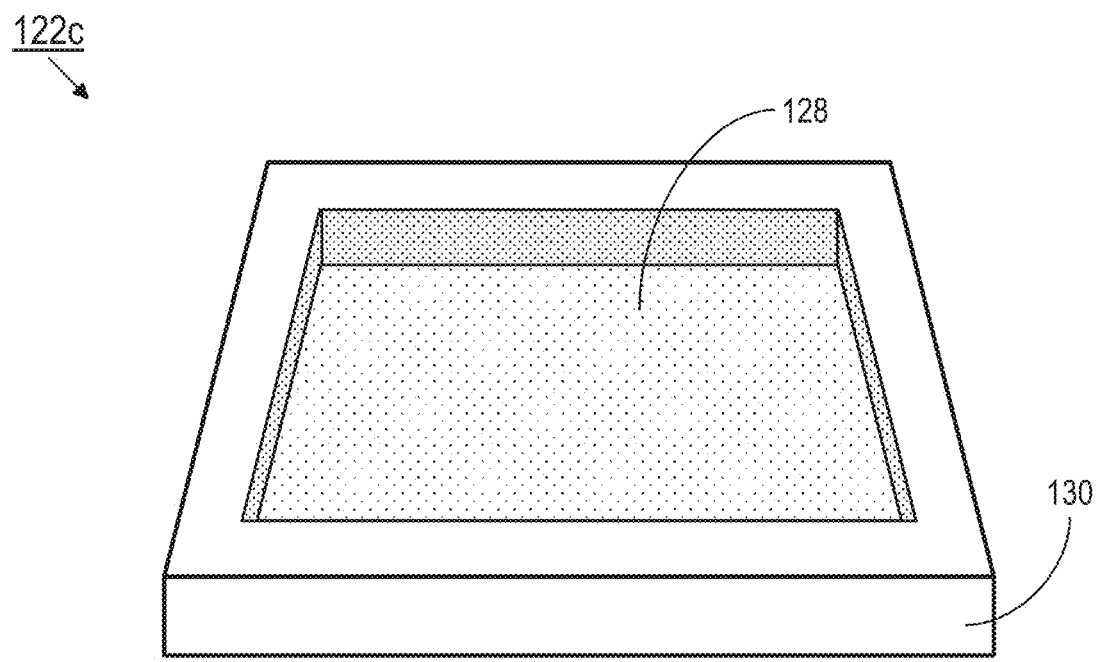
FIGS. 6A and 6B are respectively overhead perspective and profile views of an integrated aircraft lighting and display panel of the system of FIG. 1.
Figure 6B:
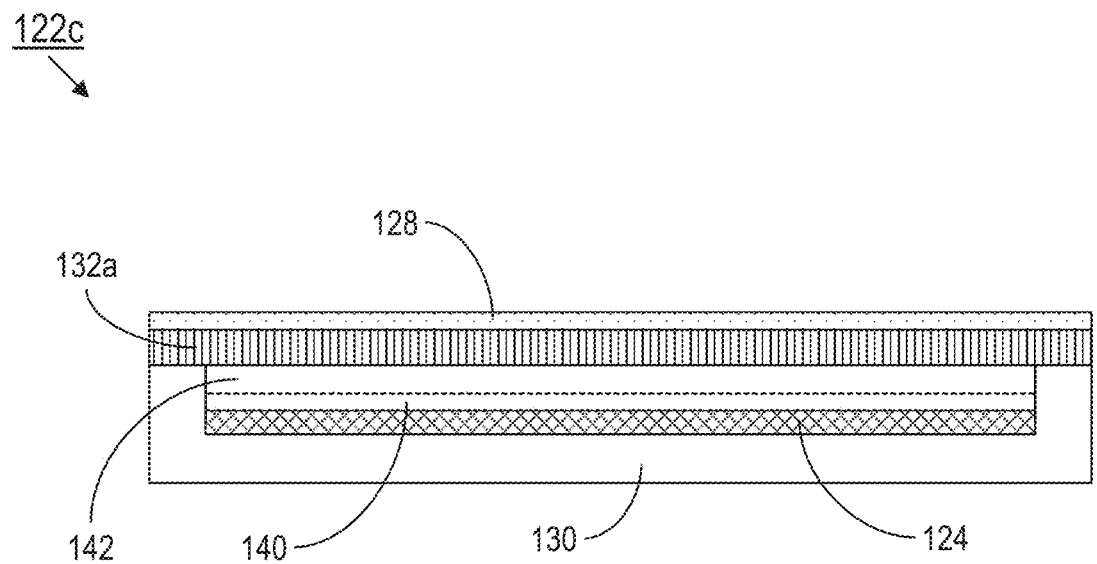

Referring to FIGS. 6A and 6B, the integrated lighting and display panel 122c of the of the integrated aircraft lighting and display system 100, 100a-b may be implemented and may function similarly to the integrated lighting and display panel 122b of FIG. 5, except that the integrated lighting and display panel 122c may be at least partially embedded in the structural layer 130. The structural layer 130 may include, but is not limited to, foam core or other similar composite materials conformable to interior surfaces of an aircraft as described above (e.g., overhead panels (102, FIG. 1), inner walls (108, FIG. 2B), zone divider panels and bulkheads (110, FIG. 2B), bin panels (112, FIG. 2B), doorway panels (114, FIG. 2B)).

Referring in particular to FIG. 6B, the integrated lighting and display panel 122c may incorporate an LED array 124 at least partially covered with a transparent encapsulant 140. In order to conserve weight, an air gap (142) may be left above the encapsulant 140 and the core material layer 132a. The core material layer 132a may be implemented and may function similarly to the honeycomb-structured composite layer 132 of FIG. 3A, except that the core material layer 132a may be disposed so as to provide structural reinforcement and stability to the integrated lighting and display panel 122c while supporting the transmission of the luminous output of the LED array 124 to, and through, the outer decorative layers 128 of translucent or transparent material via the columnar cells defined by the core material layer. For example, the core material layer 132a may be fashioned of aluminum or any similarly appropriate light, durable material in a honeycomb structure defining a series of hexagonal columnar cells. The core material layer 132a may be fashioned such that the columnar cells are hexagonal, square, or any other tessellating polygon or tessellating combination of polygons (e.g., octagonal/square). In some embodiments, the core material layer 132a may be fashioned of a laminate or semi-translucent material, such that the hexagonal or polygonal pattern defining the columnar cells is not visible through the outer decorative layer/s 128, e.g., when the LED arrays 124 are deluminated.

Figure 6C:
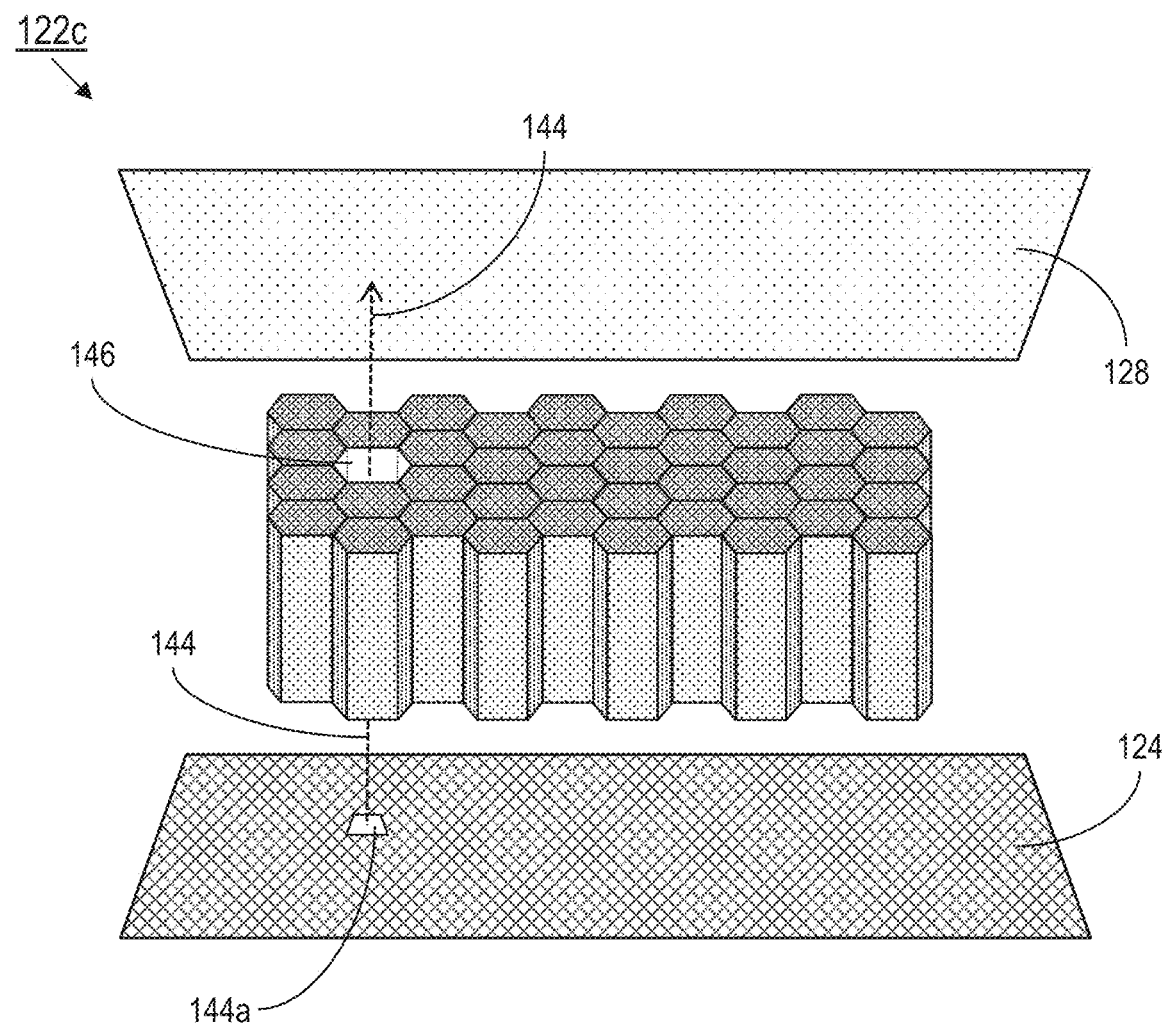
FIG. 6C is an exploded view of the panel of FIG. 6B.

Referring in particular to FIG. 6C, the core material layer 132a may be disposed between the LED array 124 and the decorative layer/s 128 such that the luminous output (144) of each LED module (144a; see also 124a, FIG. 3B) of the LED array is transmitted to the decorative layer/s via the columnar cells (146) defined by the core material layer 132a. For example, a core material layer 132a fashioned of aluminum core may have the added benefits of conductivity and reflectivity, such that, e.g., an optimal portion of the luminous output 144 is reflected by the aluminum sides of the columnar cells 146 and reaches the decorative layer/s 128. Similarly, excess heat generated by the LED modules 144a may be conducted to the surface (e.g., the decorative layer/s 128) of the integrated lighting and display panel 122c by the core material layer 132a.

Figure 6D:
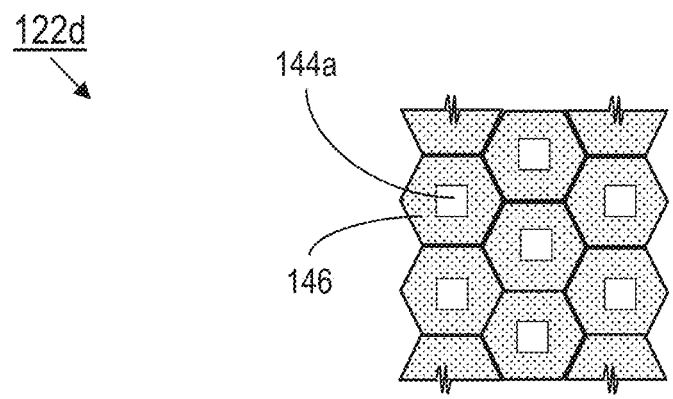
FIG. 6D is an overhead inset view of the panel of FIG. 6B.

Referring in particular to FIG. 6D, the integrated lighting and display panel 122d may be implemented and may function similarly to the integrated lighting and display panel 122c, except that the integrated lighting and display panel 122d may position an LED module 144a within each individual columnar cell 146 defined by the core material layer 132a. For example, each LED module 144a may be centered within a columnar cell 146.

Figure 7:
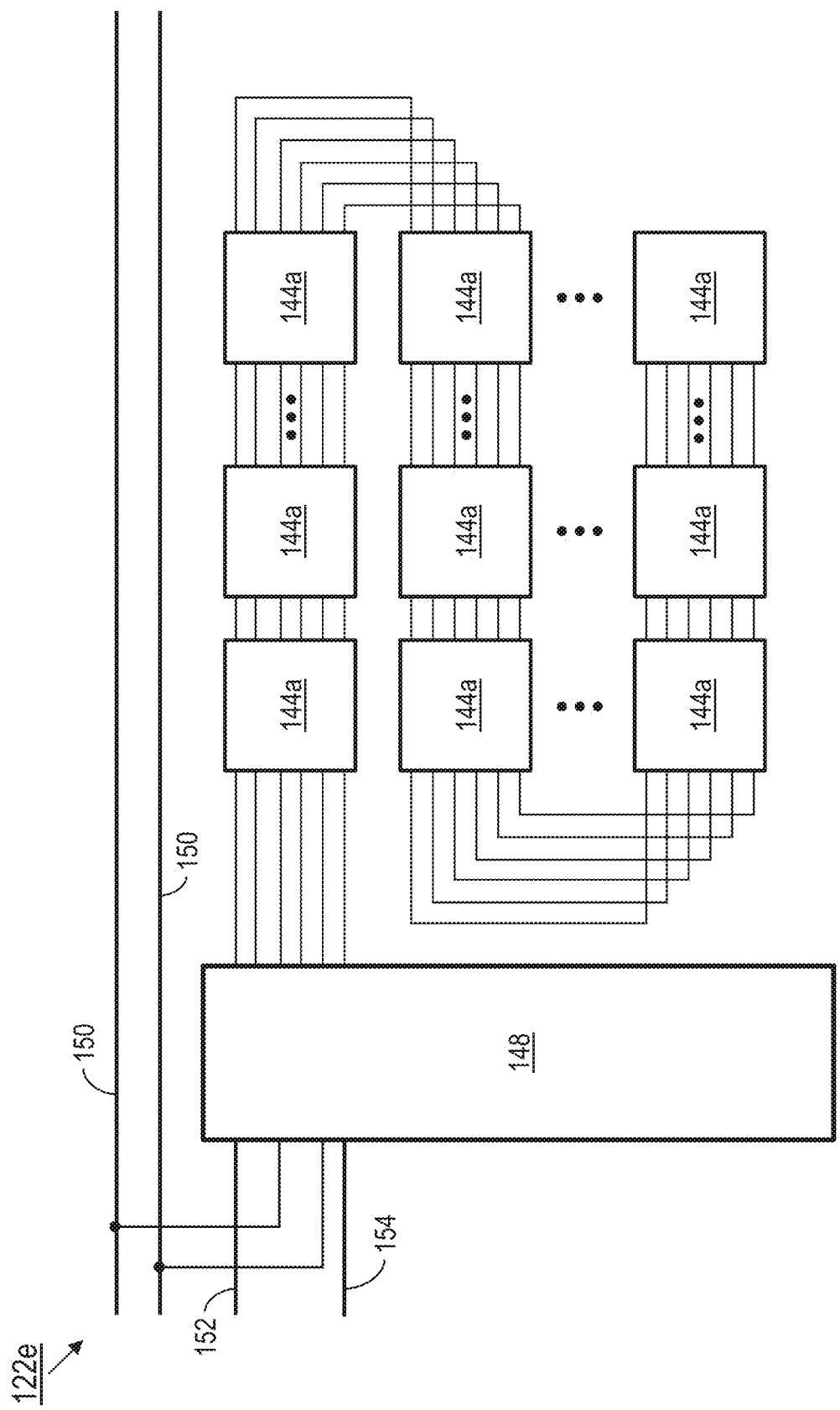
FIG. 7 is a diagrammatic illustration of the panel of FIG. 6B.

Referring to FIG. 7, the integrated lighting and display panel 122e may be implemented and may function similarly to the integrated lighting and display panels 122c-d of FIGS. 6A through 6D, except that the integrated lighting and display panel 122e may incorporate a micro lighting control unit (MLCU) 148 connected to, e.g., aircraft network buses (e.g., RS485, CANBUS) 150, aircraft power supplies 152, and aircraft data interfaces 154 (e.g., Airbus Cabin Intercommunication Data System (CIDS)) from which the MLCU may receive instructions and operating power. The MLCU 148 may be implemented and may operate similarly to the display controllers 136, 136a-b of FIG. 5, except that the MLCU 148 may supply the array (124, FIG. 6A-C) of LED modules 144a distributed throughout the integrated lighting and display panel 122e with power and instructions, e.g., synchronization signals, clock signals, activation instructions). The LED modules 144a may be distributed throughout the integrated lighting and display panel 122e in any appropriate pattern. For example, the LED modules 144a may be distributed so as to provide a uniformly lit surface, e.g., for cabin lighting or image display functions.

Figure 8:
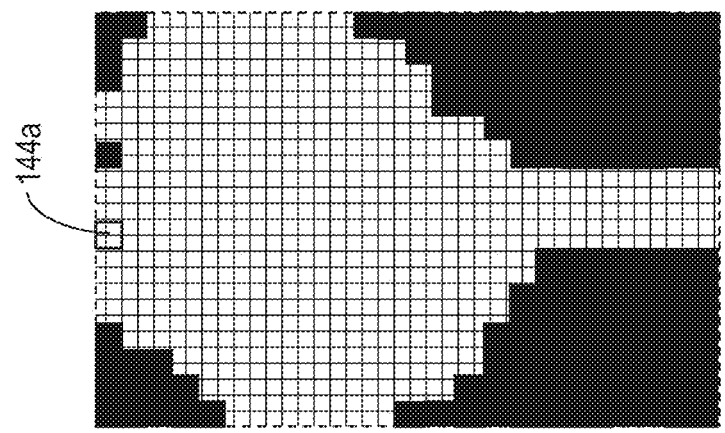
FIG. 8 is an illustration of the panel of FIG. 6B.
Figure 8:
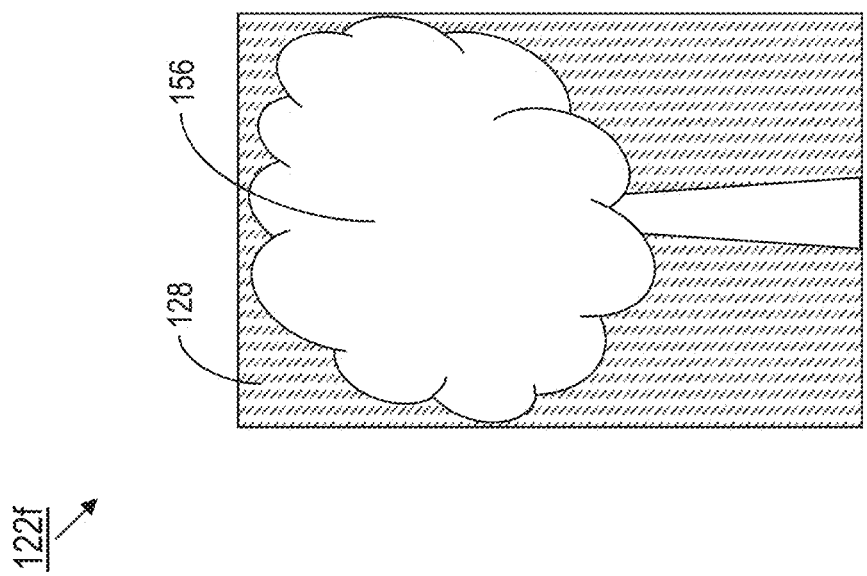

Referring to FIG. 8, the integrated lighting and display panel 122f may be implemented and may function similarly to the integrated lighting and display panel 122e of FIG. 7, except that the integrated lighting and display panel 122f may incorporate the placement and arrangement of LED modules 144a to conform to a pattern or design associated with the decorative layer 128. For example, as described above, the decorative layer 128 may be configured to present the appearance of other decorative materials within which one or more ornamental patterns (156), e.g., a tree, may be visible. The integrated lighting and display panel 122f may conserve weight and power by arranging LED modules (144a) only behind those portions of the decorative layer 128 conforming to the ornamental pattern 156, rather than distributing the LED modules throughout the whole of the integrated lighting and display panel 122f.

Figure 9A:
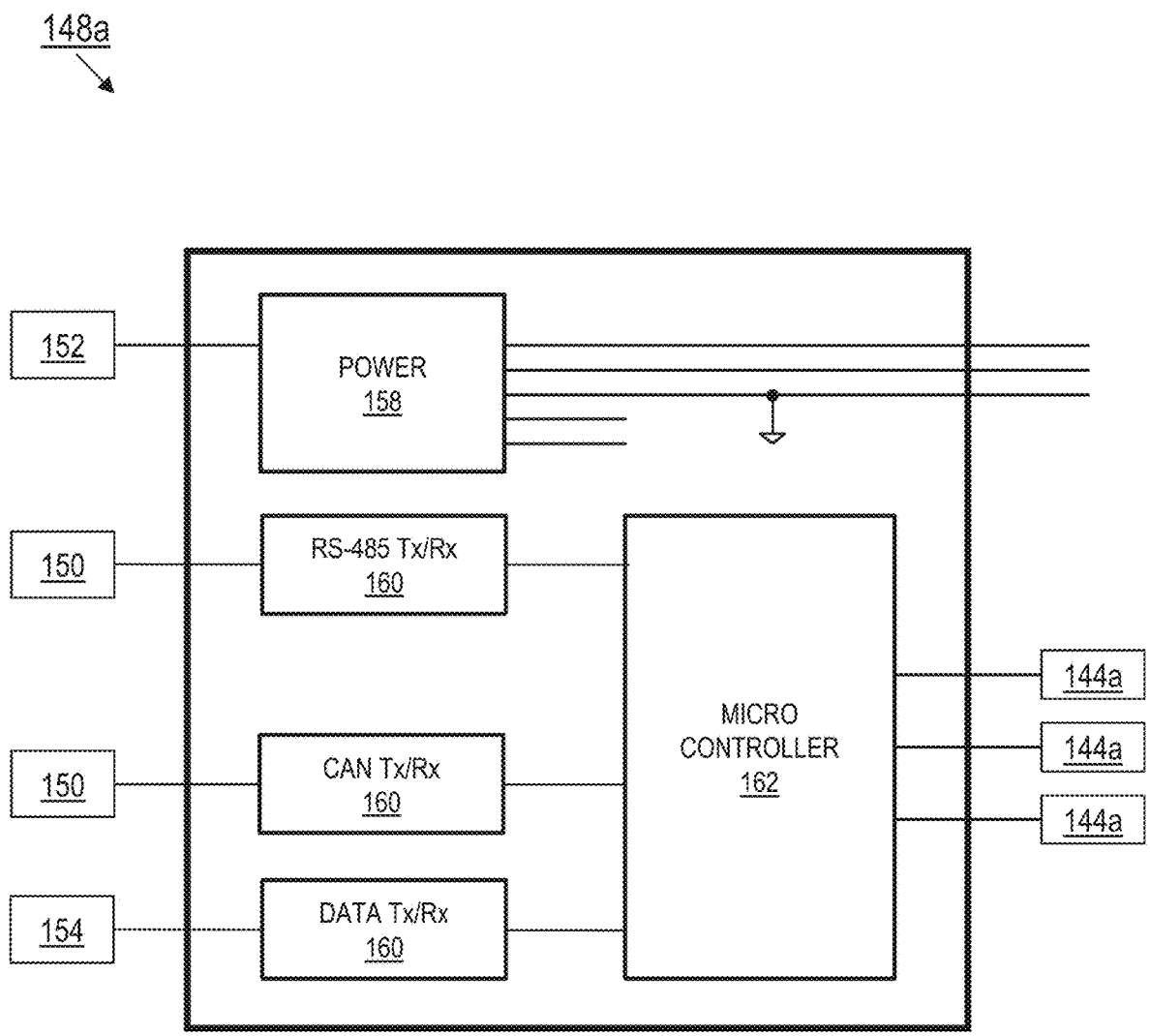
FIG. 9A is a diagrammatic illustration of a lighting control unit (LCU) of the panel of FIG. 7.

Referring to FIG. 9A, the MLCU 148a may be implemented and may function similarly to the MLCU 148 of FIG. 7, except that the MLCU 148a may incorporate a power supply 158, transceivers 160, and a microcontroller 162. The power supply 158 may be connected to the aircraft power supply (152) and supply operating power to the LED modules (144a, FIG. 7) within a given integrated lighting and display panel (122f, FIG. 8). The transceivers 160 may provide two-way (transmit/receive) communications between the MLCU 148a and aircraft network buses 150 and data interfaces 154. The microcontroller 162 may relay activation instructions from the transceivers 160 to the individual LED modules 144a.

Figure 9B:
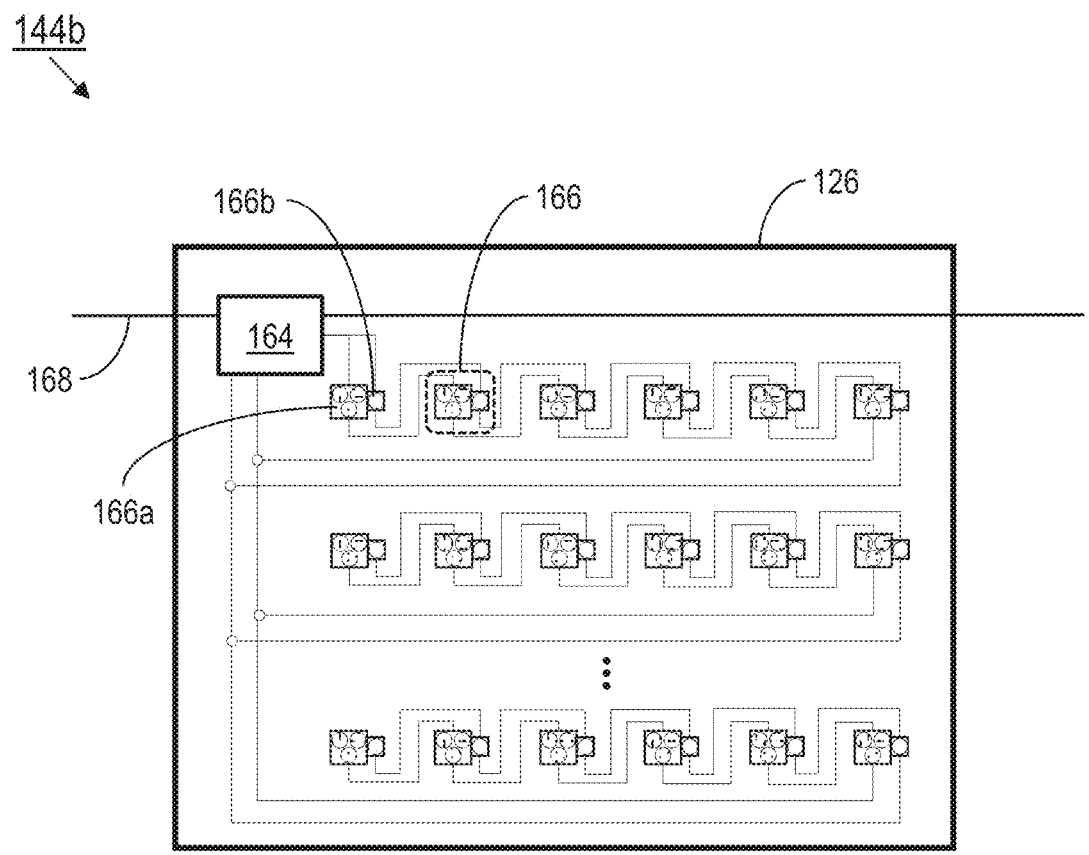
FIGS. 9B and 9C are diagrammatic illustrations of LED modules of the panel of FIG. 7.

Referring to FIG. 9B, the LED module 144b may be implemented and may function similarly to the LED modules 144a of FIGS. 7 and 9A, except that each individual LED module 144b may incorporate a local microcontroller unit 164 (MCU) and an array of LED units 166 mounted to a flexible printed circuit board (PCB) 126. The LED units 166 may be arranged on the PCB 126 as an M×M square array, e.g., a 6×6 square array of 36 LED units connected in sequence, as an M×N rectangular array (wherein M and N are integers), or in any other appropriate pattern of individual LED units (e.g., concentric circles, triangles, 1×M single-unit LED arrays, other polygonal arrays). Each local MCU 164 may be connected to (168) the power supply (158, FIG. 9A) and microcontroller (162, FIG. 9A) of the MLCU (148a, FIG. 9A) for the integrated lighting and display panel (122e, FIG. 7) within which the LED module 144b is disposed. The LED module 144b may thereby receive operating power, synchronization signals, clock signals, data, or operating instructions from the MLCU 148a.

Each LED unit 166 may incorporate an RGB LED (166a) and a white LED (166b) which may be activated or deactivated per instructions received by the local MCU 164. In some embodiments, each individual LED unit 166 of each LED module 144b may be individually addressable, allowing the integrated lighting and display panel 122e to display high-resolution still or streaming images.

Figure 9C:
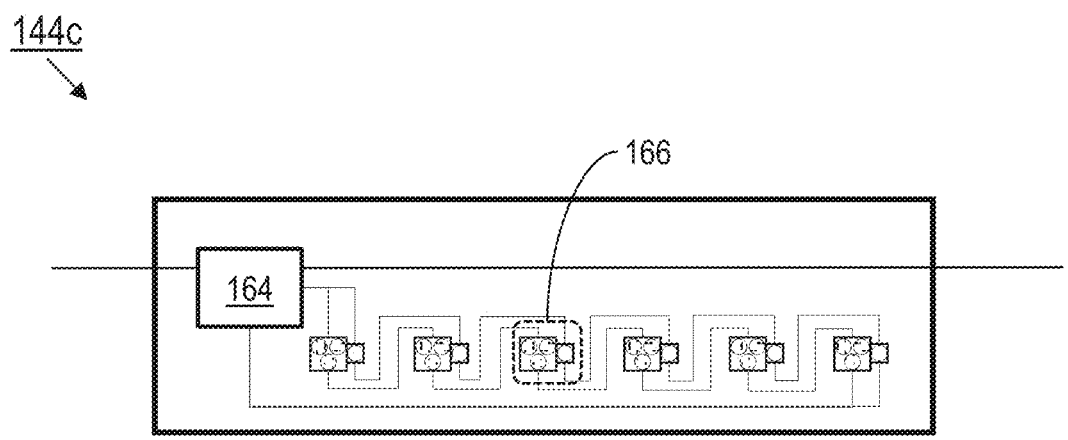

Referring to FIG. 9C, the LED module 144c may be implemented and may function similarly to the LED module 144b of FIG. 9B, except that the LED module 144c may be an LED strip incorporating a 1×M linear array of LED units 166. In some embodiments, the LED module 144c may be incorporated into a thin flexible LED strip wherein each LED module 144c may correspond to an addressable segment, or wherein each LED unit 166 is individually addressable.

Integrated lighting and display systems according to the inventive concepts herein enhance display functionality within the passenger cabin while reducing weight, complexity, and cost. Almost any desired interior paneled surface within the passenger cabin can be adapted with LED arrays designed for cabin lighting, emergency signage, high-resolution image and video display, or any combination of the three.

Figure 10:
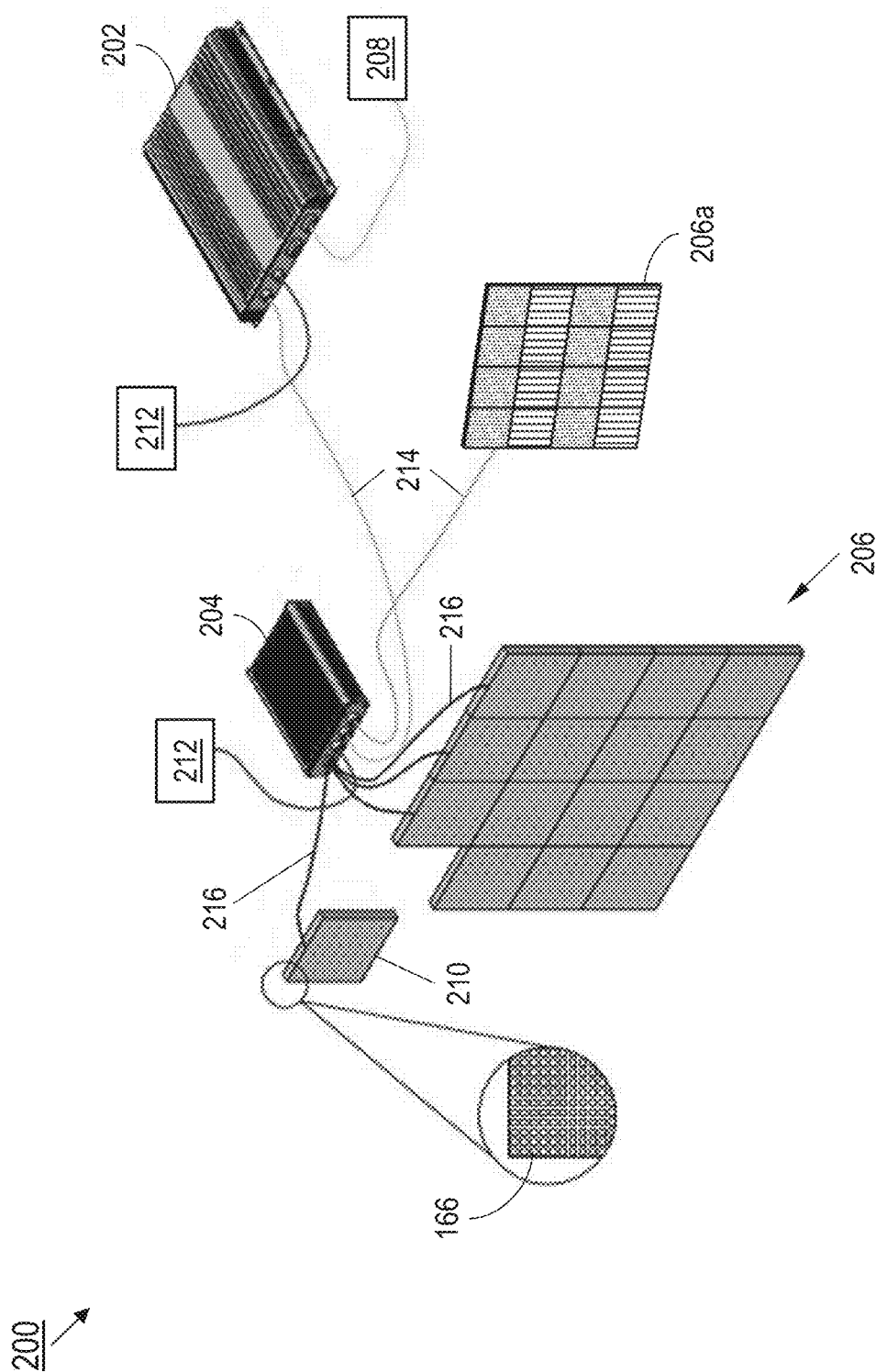
FIG. 10 is an exploded view illustrating an integrated signage, lighting, and display system in accordance with embodiments of the inventive concepts disclosed herein.

Referring to FIG. 10, the integrated signage, lighting, and display system 200 may be implemented and may function similarly to the display systems 100, 100a-b of FIGS. 1 through 9C, except that the master display controller or aircraft controller of the integrated signage, lighting, and display system 200 may include one or more video processing units 202 (VPU), one or more panel control units 204 (PCU), and one or more LED panels 206. Alternatively, the VPU 202 may be connected to an aircraft master controller 208, receiving communications and control input therefrom.

In embodiments, the PCU 204 and LED panels 206 may be implemented and may function similarly to the display controller 136, 136a-c and the individual panels 122, 122a-f of FIGS. 3A through 8, except that each LED panel 206 may comprise a group or array of interconnected LED tiles 210. For example, each LED tile 210 may include a PCB (126, FIG. 3A-B) with an array of individual LED units 166 mounted or otherwise attached thereto. The individual LED units 166 may be arranged in a two-dimensional M×N array (e.g., where M and N are integers; see, e.g., FIG. 9A); a one-dimensional 1×P strip (e.g., where P is an integer; see, e.g., FIG. 9B); or a freeform/non-linear arrangement of LED units throughout a PCB 126 of a particular size (e.g., a 2-ft×2-ft LED panel 206 may comprise a 4×4 array of 6-inch (0.25 sq ft) LED tiles 210), based on a desired or predetermined pattern. For example, the use of multiple LED tiles 210 (e.g., larger groups of smaller tiles) may allow more precise contouring to, or coverage of, interior surfaces of the aircraft to which the LED panels 206 may be attached (or within which the LED panels may be partially embedded). As noted above, the LED panels 206 may be attached to, or partially embedded in overhead or bulkhead surfaces; class dividers; or galley structures and other monuments. Similarly, as noted above, each individual LED unit 166 may include monochrome, polychrome, or combination monochrome/polychrome (e.g., white/red/green/blue (WRGB)) LED units of a variety of types, e.g., standard or organic LEDs (OLED); microscopic (<1 mm) size LEDs (e.g., micro-LED or μLED; quantum dots (qdots; QD) or other like semiconducting nanocrystals; or phosphor-converted LEDs.

In embodiments, the VPU 202 and PCU 204 may each be connected to an aircraft power supply 212 and receive operating power (e.g., 115 VAC, 400 Hz) therefrom. The VPU 202 may be connected to one or more PCU 204 via HDBaseT or other appropriately similar digital single-cable connection 214 capable of carrying high-definition video and audio, Ethernet, controls, and power throughout an aircraft interior. A single VPU 202 may be connected to, and may control, multiple PCU 204; in some embodiments the PCU 204 may be a primary PCU connecting the VPU to one or more additional LED panels 206a (via secondary or auxiliary PCUs, not shown) through the primary PCU (e.g., via HDBaseT, DVI, USB, PWR/COMM physical interface connectors, or like digital cable connection 214).

In embodiments, a PCU 204 may be connected to each LED tile 210 individually (via cable 216), or in some embodiments the PCU may be connected to secondary LED tiles of a given LED panel 206 via primary LED tiles, as described below.

Figure 11A:
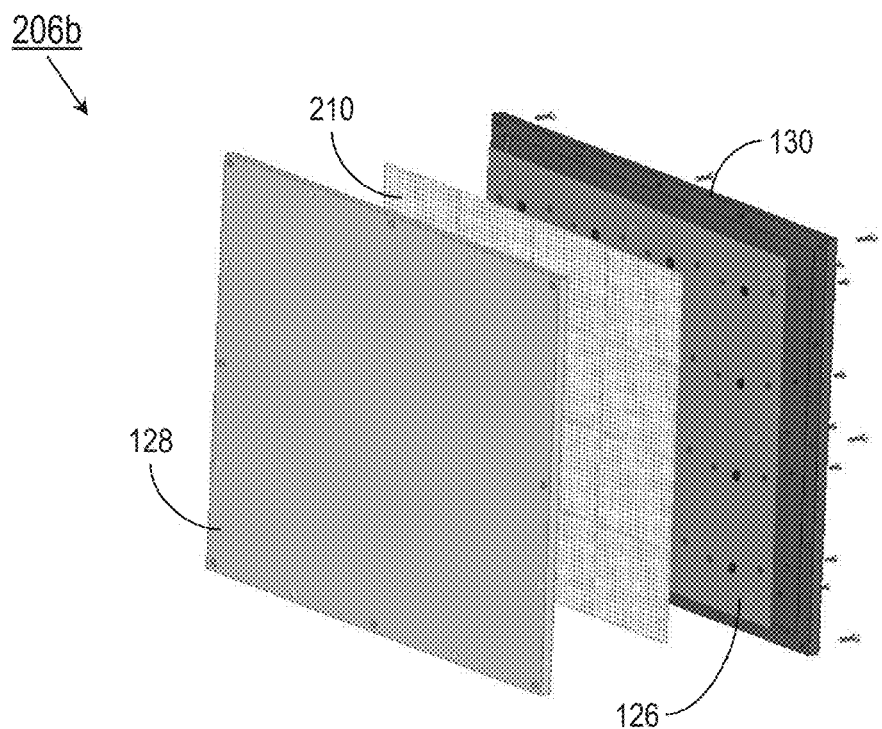
FIGS. 11A and 11B illustrate respectively LED panels and interconnections of the integrated signage, lighting, and display system of FIG. 10.
Figure 11B:
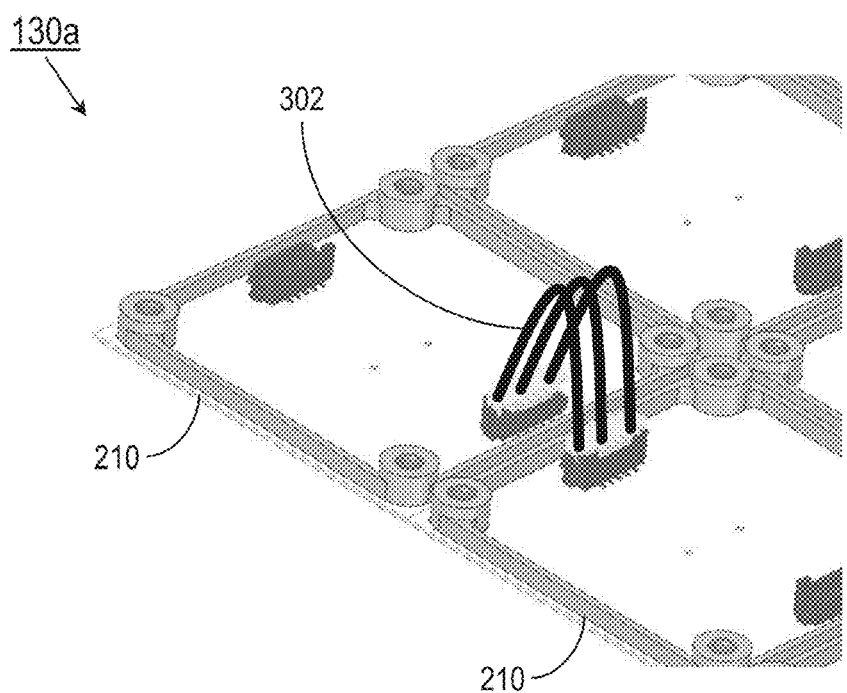

Referring now to FIGS. 11A and 11B, the LED panel 206b may be implemented and may function similarly to the LED panel 206, 206a of FIG. 10, except that the LED panel 206b may incorporate one or more structural layers 130 and/or one or more decorative layers 128 in addition to the LED tiles 210 and underlying PCB 126. Referring in particular to FIG. 11B, the structural layer 130a may be implemented and may function similarly to the structural layer 130 of FIG. 11A, except that the structural layer 130a may incorporate interconnecting cables 302 linking individual LED tiles 210 within an LED panel 206a.

Figure 12:
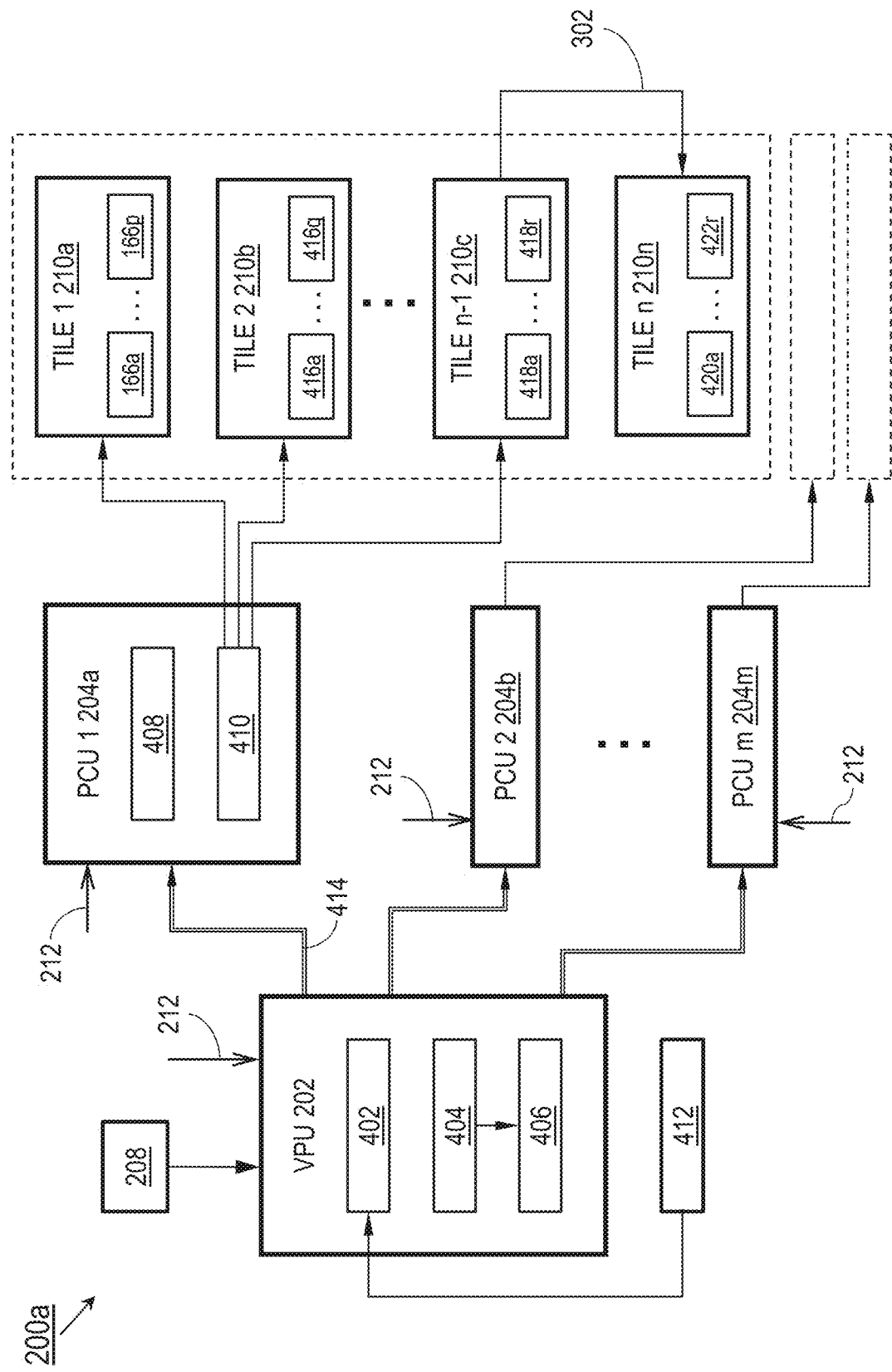
FIG. 12 is a diagrammatic illustration of the integrated signage, lighting, and display system of FIG. 10.

Referring to FIG. 12, the integrated signage, lighting, and display system 200a may be implemented and may function similarly to the integrated signage, lighting, and display system 200 of FIG. 10, except that the VPU 202 of the integrated signage, lighting, and display system 200a may include video processors 402, media players 404, and sender cards 406. Each of m PCUs 204a . . . 204m connected to the VPU 202 may include a driver/control unit 408 (which may include additional control processors) and interface 410. Similarly, each LED panel 206 may include N LED tiles 210a . . . 210n (e.g., where N is an integer), each LED tile comprising an array or group of individual LED units 166a-p, 166a-q, 166a-r, 166a-s. The VPU 202 and PCUs 204a-m may each receive operating power from an aircraft power supply (212). In some embodiments, VPUs 202 and PCUs 204a-m may be physically mounted or attached to an LED panel 206, e.g., via mounting slots.

In embodiments, the video processors 402 may generate high definition video/streaming image content or may retrieve pre-recorded or pre-generated streaming image content from memory 412 (or from other connected data storage devices). For example, streaming image content may be pre-recorded for playback during particular flight segments (e.g., safety announcements, pre-boarding and boarding sequences, emergency procedures, deplaning sequences, connecting flight information, environmental or atmospheric sequences) based on the time of day, the current flight segment, or other detected conditions (e.g., atmospheric, environmental, emergency). The video processors 402 and media players 404 may pass raw image content to the sender cards 406, which encode the raw content into video signals 414 for the PCUs 204a-m. For example, the sender cards 406 may include pixel mappers for mapping the encoded video content to individual LED tiles 210a-n or individual LED units (166a-p, 416a-q, 418a-r, 420a-s) thereof. Similarly, the sender cards 406 may distribute portions of the encoded video content to the corresponding individual PCUs 204a-n and LED panels 206 via the encoded video signals 414.

The encoded video signals 414 may be received by the driver/control units 408 of each PCU 204a-n and distributed, via the interfaces 410, to each LED tile 210a-n of each LED panel 206 connected to a particular PCU 204a. For example, based on pixel mapping (e.g., by the sender cards 406), the individual LED units 166a-p, 416a-q, 418a-r, 420a-s of one or more LED tiles 210a-n may display particular assigned portions of a larger streaming video or image sequence.

Simultaneously, other selected LED units 166a-p, 416a-q, 418a-r, 420a-s of one or more LED tiles 210a-n may not be associated with any instructions corresponding to a displayed low definition/high definition video or image sequence, and may either remain inactive or be activated according to lighting or signage instructions (e.g., to provide static signage or uniformly diffuse luminous output associated with cabin lighting, wash lighting, flex lighting, directional lighting, emergency lighting, or any other appropriate types of interior lighting).

Figure 13:
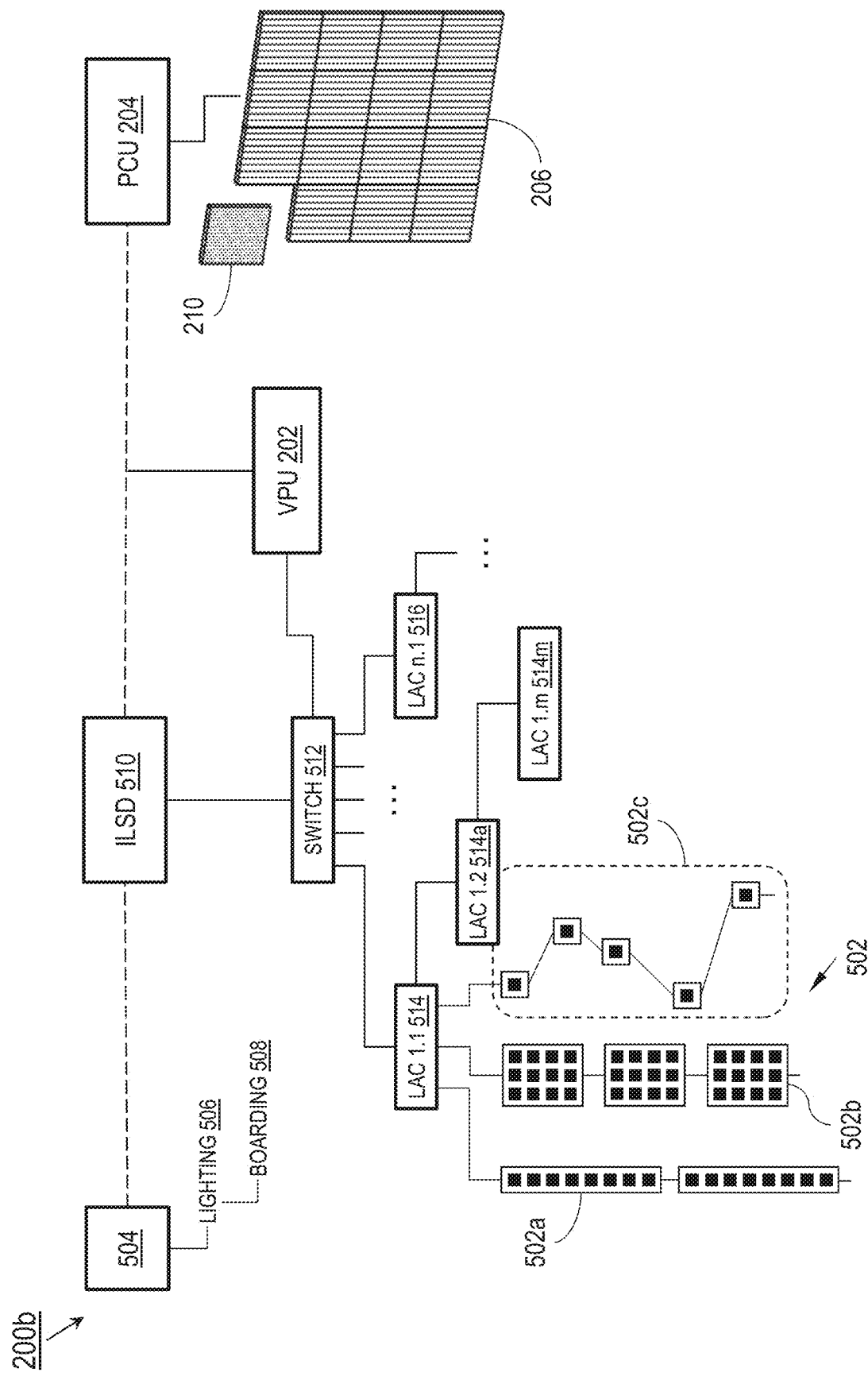
FIG. 13 is a diagrammatic illustration of the integrated signage, lighting, and display system of FIG. 10 fully integrating cabin lighting, signage, and display equipment.

Referring to FIG. 13, the integrated signage, lighting, and display system 200b may be implemented and may function similarly to the integrated signage, lighting, and display system 200a of FIG. 12, except that the integrated signage, lighting, and display system 200b may incorporate LED panels 206 and cabin lighting assemblies 502 in a unified system for blending signage, lighting, and low-definition/high/definition video and streaming image display responsive to control input provided via a flight attendant panel 504 (FAP).

In embodiments, the FAP 504 may initiate, based on control input provided by a member of the cabin crew or automatically (e.g., based on a detected condition such as a time, an altitude, a position, a flight segment, a rate of change) a preprogrammed lighting, signage, and display scheme (e.g., stored to memory 412, FIG. 4). For example, preprogrammed schemes may adjust interior lighting 506 in specific ways based on the time of day or upon reaching a safe cruising altitude, e.g., turning down lighting intensity or shifting spectral output so passengers may rest or in conjunction with pre-recorded announcements associated with safety presentations, boarding procedures 508, deplaning procedures, emergency procedures, or branding/advertising/commercial messages.

In embodiments, the lighting, signage, and display system 200b may incorporate an interior lighting system director (ILSD) 506 including control processors for managing each cabin lighting assembly 502 throughout the aircraft on an individual basis. For example, the ILSD 506 may be connected to one or more switches 512, each switch connected to a primary local area controller 514 (LAC). The primary LAC 514 may in turn be connected in seriatim to a group of secondary LAC 514a . . . 514m, the primary LAC and each secondary LAC responsible for a particular cabin lighting assembly 502 and a group of secondary LAC connected to a given primary LAC corresponding to a particular area of the aircraft cabin. The switch 512 may be connected to N primary LAC 514, 516, and each primary LAC in turn may be connected to a series of M secondary LACs 514a-m (different primary LACs may control different numbers of secondary LACs), such that the ILSD 510 may control any individual cabin lighting assembly 502 as directed by the FAP 504.

In embodiments, the ILSD 510 may be connected to a VPU 202 and one or more PCU 204, each PCU connected to an LED panel 206 or group of LED tiles 210 such that the ILSD may synchronize display output and luminous output throughout the cabin via the cabin lighting assemblies 502 and LED panels 206. For example, pixel mappers within the VPU 202 may blend low-resolution/high-resolution video and image display with cabin lighting effects on a pixel-by-pixel basis, using either the cabin lighting assemblies 502 or LED panels 206 (or a combination thereof) as desired. Each cabin lighting assembly 502 may combine one or more of a one-dimensional 1×M LED array or strip 502a (where M is an integer), a two-dimensional N×P LED array or tile 502b (where N and P are integers), or a non-linear arrangement (e.g., polygons, concentric circles, freeform arrangements) of individual LED units (166, FIG. 9B-C) on a PCT 126 or structural layer (e.g., according to a predetermined design).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An integrated aircraft signage, lighting, and display system, comprising:
at least one video processing unit (VPU) coupled to a power supply of an aircraft and in communication with at least one of a master controller of the aircraft, a network of the aircraft, and a data interface of the aircraft, the VPU comprising:
at least one video processor configured to a) generate streaming image content and b) retrieve stored streaming image content from at least one data storage unit in communication with the video processor;
and
at least one sender card configured to generate a video signal by encoding the streaming image content;
one or more panel control units (PCU) in communication with the VPU, each PCU comprising:
a driver unit including at least one control processor configured to a) receive at least a portion of the encoded video signal and b) generate control input based on the received portion;
and
at least one panel interface coupled to the power supply and to the control processor, the panel interface configured to supply at least one of operating power and the control input to at least one light emitting diode (LED) panel in communication with the PCU;
the at least one LED panel comprising:
a base substrate;
a plurality of LED tiles attached to the base substrate, the plurality of LED tiles in communication with the panel interface and configured to receive the operating power and the control input therefrom, each LED tile comprising:
at least one printed circuit board (PCB) attached to the base substrate;
and
a plurality of LED units arranged on the PCB, each LED unit configured to generate at least one of a luminous output and a display output, the display output corresponding to the received control input.

2. The integrated aircraft signage, lighting, and display system of claim 1, wherein the encoding of the streaming image content includes mapping the streaming image content to one or more LED units of the plurality of LED units.

3. The integrated aircraft signage, lighting, and display system of claim 1, wherein the plurality of LED tiles includes at least one of:
a two-dimensional (2D) array of M×N LED units, where M and N are integers;

a one-dimensional (1D) strip of 1×P LED units, where P is an integer;
and
a freeform arrangement of the LED units on the PCB.

4. The integrated aircraft signage, lighting, and display system of claim 1, wherein:
the plurality of LED tiles are interconnected by at least one of a connection cable and a wire harness.

5. The integrated aircraft signage, lighting, and display system of claim 4, wherein the plurality of LED tiles includes:
at least one primary LED tile in communication with the panel interface and configured to receive the operating power and the control input therefrom;
and
at least one secondary LED tile in communication with the at least one primary LED time and configured to receive the operating power and the control input therefrom.

6. The integrated aircraft signage, lighting, and display system of claim 1, wherein each LED unit of the plurality of the LED units includes at least one of a monochromatic LED, a polychromatic LED, a combination white/red/green/blue (WRGB) LED, and an LED individually addressable by at least one of the PCU and the VPU.

7. The integrated aircraft signage, lighting, and display system of claim 1, wherein the base substrate includes at least one flexible substrate conformable to an interior panel of the aircraft.

8. The integrated aircraft signage, lighting, and display system of claim 1, wherein the base substrate includes at least one structural layer attachable to an interior panel of the aircraft.

9. The integrated aircraft signage, lighting, and display system of claim 1, wherein the at least one first LED panel further comprises:
at least one decorative layer defining an outermost surface of the LED panel, the decorative layer capable of at least partially transmitting the luminous output and the display output into a cabin of the aircraft.

10. The integrated aircraft signage, lighting, and display system of claim 9, further comprising:
at least one heat sink disposed between the plurality of LED tiles and the decorative layer, the heat sink configured to dissipate a thermal output associated with the plurality of LED tiles.

11. The integrated lighting and display control system of claim 1, wherein the plurality of LED tiles are first LED tiles and the control input is first control input, further comprising:
at least one interior lighting system controller (ILSC) in communication with the VPU and with at least one flight attendant panel of the aircraft, the ILSC including at least one lighting control processor configured to a) receive secondary control input and b) transmit at least a portion of the secondary control input to the VPU for execution;
and
a plurality of lighting assemblies operatively coupled to the ILSC by at least one switch, each lighting assembly comprising:
a plurality of local area controllers (LAC) in communication with the switch, the plurality of LAC including at least one microcontrol processor;
and
at least one second LED tile in communication with each LAC, the second LED tile comprising a plurality of LED units configured for activation or deactivation by the ILSC via the switch.

12. The integrated lighting and display control system of claim 11, wherein the plurality of LAC includes:
at least one primary LAC communicatively coupled to the switch;
and
one or more secondary LAC serially connected to the primary LAC.

13. The integrated lighting and display control system of claim 11, wherein the ILCS is configured to receive the control input from at least one of the flight attendant panel, the network, the master controller, and the data interface.

14. The integrated lighting and display control system of claim 11, wherein the ILCS is configured to activate or deactivate the plurality of LED units based on at least one preprogrammed command sequence stored to the data storage unit.

15. The integrated lighting and display control system of claim 14, wherein the at least one preprogrammed command sequence is associated with at least one of a time, a flight segment, and a detected condition.

* * * * *